(12) United States Patent
Morsy et al.

(10) Patent No.: US 8,582,565 B1
(45) Date of Patent: Nov. 12, 2013

(54) SYSTEM FOR STREAMING AUDIO TO A MOBILE DEVICE USING VOICE OVER INTERNET PROTOCOL

(71) Applicant: TV Ears, Inc., Spring Valley, CA (US)

(72) Inventors: Amre Morsy, Mesa, AZ (US); David Kern, Tempe, AZ (US); George Dennis, Las Vegas, NV (US)

(73) Assignee: TV Ears, Inc., Spring Valley, CA (US)

( * ) Notice: Subject to any disclaimer, the term of this patent is extended or adjusted under 35 U.S.C. 154(b) by 0 days.

(21) Appl. No.: 13/853,949

(22) Filed: Mar. 29, 2013

Related U.S. Application Data

(63) Continuation of application No. 13/839,751, filed on Mar. 15, 2013.

(60) Provisional application No. 61/711,670, filed on Oct. 9, 2012.

(51) Int. Cl.
*H04L 12/66* (2006.01)

(52) U.S. Cl.
USPC ...... 370/352; 370/252; 348/14.08; 348/14.04

(58) Field of Classification Search
USPC ......... 370/252, 254, 259, 260, 261, 262, 352; 379/88.18, 88.04, 88.16; 455/3.06, 455/404.2, 556.1; 725/117, 106; 348/14.08, 348/14.04; 709/203, 205
See application file for complete search history.

(56) References Cited

U.S. PATENT DOCUMENTS

| | | | |
|---|---|---|---|
| 7,149,469 B2 | 12/2006 | Russell | |
| 7,542,553 B2 * | 6/2009 | Gurfein et al. | 379/88.18 |
| 7,996,040 B1 | 8/2011 | Timm | |
| 2003/0208755 A1 | 11/2003 | Zimmerman | |
| 2005/0102703 A1 * | 5/2005 | Querashi et al. | 725/117 |
| 2008/0134276 A1 | 6/2008 | Orrell et al. | |
| 2008/0249874 A1 | 10/2008 | Seo | |
| 2008/0281990 A1 | 11/2008 | Wan | |
| 2009/0034450 A1 | 2/2009 | Urner | |
| 2009/0055385 A1 | 2/2009 | Jeon et al. | |
| 2009/0144361 A1 * | 6/2009 | Nobakht et al. | 709/203 |
| 2009/0164876 A1 * | 6/2009 | Logan et al. | 715/201 |
| 2009/0249407 A1 | 10/2009 | Manne et al. | |
| 2009/0318077 A1 * | 12/2009 | Ghahramani | 455/3.06 |
| 2010/0333156 A1 * | 12/2010 | Abdolsalehi | 725/106 |

(Continued)

OTHER PUBLICATIONS

Audivero website, http://www.audiovero.com, last accessed on Sep. 12, 2013, and Audivero application web page available at https://play.google.com/store/apps/details?id=com.audivero.audivero&hl=en, last accessed on Sep. 12, 2013.

*Primary Examiner* — Abdullah Riyami
(74) *Attorney, Agent, or Firm* — Knobbe Martens Olson & Bear LLP

(57) ABSTRACT

This disclosure describes embodiments of systems and methods that use protocols and techniques that can stream audio from a video device to a separate device while reducing or eliminate audio/video synchronization errors. In some embodiments, these systems and methods use Voice over IP (VoIP) technology to stream audio to mobile devices with low latency, resulting in little or no user-perceivable delay between the audio stream and corresponding video presentation. As a result, users can enjoy both the audio and video of any video display in an establishment. In addition, the systems and methods described herein may be implemented in the home or other locations to allow viewers who may be hard of hearing to listen to audio clearly via headphones.

16 Claims, 19 Drawing Sheets

(56) References Cited

U.S. PATENT DOCUMENTS

| | | |
|---|---|---|
| 2012/0081501 A1 | 4/2012 | Benzaia et al. |
| 2012/0117490 A1* | 5/2012 | Harwood et al. ............. 715/757 |
| 2012/0166952 A1* | 6/2012 | Alexandrov et al. ......... 715/730 |
| 2012/0308032 A1 | 12/2012 | Ginn et al. |
| 2012/0308033 A1* | 12/2012 | Ginn et al. ..................... 381/77 |
| 2012/0308035 A1 | 12/2012 | Ginn et al. |
| 2012/0309366 A1 | 12/2012 | Ginn et al. |
| 2012/0311642 A1 | 12/2012 | Ginn et al. |
| 2012/0329420 A1* | 12/2012 | Zotti et al. ................. 455/404.2 |
| 2013/0107029 A1* | 5/2013 | Knasel et al. ................... 348/77 |
| 2013/0142332 A1* | 6/2013 | Ramos et al. ................. 380/236 |
| 2013/0162755 A1* | 6/2013 | Swanson et al. ........... 348/14.08 |

* cited by examiner

SYSTEM FOR STREAMING AUDIO TO A MOBILE DEVICE USING VOICE OVER INTERNET PROTOCOL

RELATED APPLICATION

This application is a continuation of U.S. patent application Ser. No. 13/839,751, filed Mar. 15, 2013, titled "System For Streaming Audio to A Mobile Device Using Voice Over Internet Protocol", which claims priority under 35 U.S.C. §119(e) to U.S. Provisional Application No. 61/711,670, filed Oct. 9, 2012, titled "System and Method for Providing Access to Real-Time Audio Sources Using a Computer Network," the disclosures of both of which are hereby incorporated by reference in their entirety.

BACKGROUND

Television distribution systems today broadcast numerous programs, as well as other audio-visual content, via cable, satellite, and Internet streaming channels. Many public establishments include multiple televisions, monitors, or projection systems that simultaneously provide many different such programs concurrently for the enjoyment of their clientele. Often, these video devices are placed in relatively close proximity to each other, or are placed in the same room, so that any patron of the establishment may elect to view any of multiple video devices from a single vantage point.

To avoid the confusion arising from each video device outputting different audio simultaneously, many establishments mute or drastically lower the volume of video devices. Some establishments instead increase the audio volume of a single video device perceived to be have the most popular programming while muting or lowering the volume of other devices. To assist users in understanding the missing or difficult to discern audio content, establishments typically enable captions or subtitles on video devices to display text as a partial substitute for the missing audio.

SUMMARY

For purposes of summarizing the disclosure, certain aspects, advantages and novel features of several embodiments have been described herein. It is to be understood that not necessarily all such advantages can be achieved in accordance with any particular embodiment of the features disclosed herein. Thus, the embodiments disclosed herein can be embodied or carried out in a manner that achieves or optimizes one advantage or group of advantages as taught herein without necessarily achieving other advantages as can be taught or suggested herein.

In certain embodiments, a system for streaming an audio feed associated with a corresponding video includes a content server including computer hardware. The computer hardware can include a sound card driver that can receive audio sources from a plurality of video devices, each audio source including audio associated with a corresponding video; a feed data repository that can store data mapping each audio source to an audio feed accessible by a conference call identifier, thereby providing a plurality of audio feeds; a web server that can receive a request from a user device to access a list of the audio feeds and to provide the list of the audio feeds to the user device to enable a user to select one of the audio feeds for streaming; a Voice over IP (VoIP) server that can receive a VoIP request from the user device, the VoIP request including a selected conference call identifier identifying a selected audio feed of the list of audio feeds; and a conference call bridge that can connect the user device to a conference call associated with the selected conference call identifier to make the selected audio feed available for streaming to the user device.

In certain embodiments, the system of the preceding paragraph can include any subcombination of the following features, among others. For example, the content server can further include a wireless access point that can provide wireless access to the user device. The system can also include one or more signal processing modules that can provide digitized forms of the audio sources to the content server. The one or more signal processing modules can include a high-definition multimedia interface (HDMI) audio extractor that can extract audio from a digital HDMI signal. The one or more signal processing modules can also receive one or more of the audio sources wirelessly. The one or more signal processing modules can also receive the audio source over a very high frequency (VHF) wireless connection. The system may also include a universal serial bus (USB) hub that can receive inputs from the one or more signal processing modules and to provide an output to the content server. The content server can be implemented in an audio-visual receiver. In addition, the content server can be implemented in a television. The system may also include a domain name server (DNS) that can provide instructions to the user device for downloading a mobile application to the user device, and the mobile application can access the content server to obtain the selected audio feed.

In certain embodiments, a method of streaming an audio feed associated with a corresponding video can include: by a content server including physical computer hardware: receiving audio sources from a plurality of video devices, each audio source including audio associated with a corresponding video, each audio source assigned to an audio feed accessible by a conference call identifier, thereby providing a plurality of audio feeds; receiving a request from a user device to access a list of the audio feeds; providing the list of the audio feeds to the user device to enable a user to select one of the audio feeds for streaming; receiving a Voice over IP (VoIP) request from the user device, the VoIP request including a selected conference call identifier identifying a selected audio feed of the list of audio feeds; connecting the user device to a conference call associated with the selected conference call identifier to make the selected audio feed available for streaming to the user device; and streaming the selected audio feed to the user device in response to said connecting.

In certain embodiments, the method of the preceding paragraph can include any subcombination of the following features, among others. For example, connecting the user device to the conference call can include connecting the user device as a muted participant to the conference call. Receiving the VoIP request can include receiving a session initial protocol (SIP) request. The VoIP request can implement any subset of the following protocols: a session initial protocol (SIP), a real-time transport protocol (RTP), and a uniform datagram protocol (UDP). The VoIP request can implement the H.323 protocol. The method can also include connecting second user devices to the conference call in response to requests from the second user devices to access the selected audio feed.

In certain embodiments, a system for streaming an audio feed associated with corresponding visual content can include: a data repository that can store data mapping an audio feed with a network telephony session identifier, the audio feed corresponding to an audio source associated with visual content; and a network telephony server that can: receive a network telephony call, the network telephony call referring to the conference call identifier, and provide access to a network telephony session for a user device, the conference call associated with the network telephony session identifier, wherein the conference call system makes the audio feed available for streaming to the user device via the network telephony session.

In certain embodiments, the system of the preceding paragraph can include any subcombination of the following features, among others. For example, the network telephony server can include a VoIP server. The network telephony session identifier can include a reference to the audio feed. The network telephony session identifier can include a reference to a video device associated with the audio feed. The network telephony system can also route the network telephony call to the audio source to enable the network telephony server to stream the audio source to the user device. The network telephony system can also connect additional user devices to the network telephony session. The system can also include a cellular radio that can communicate with a remote server to perform one or more of the following: receive maintenance, receive software updates, store user data, and obtain advertisements for users.

In certain embodiments, non-transitory physical computer storage can include instructions stored thereon that, when executed by one or more processors, can implement operations for streaming an audio feed associated with corresponding visual content. The operations can include: receiving audio from an audio-visual device, the audio being associated with corresponding visual content; associating the audio with a network telephony identifier; hosting a network telephony session that can provide access to the audio for one or more user devices; receiving a network telephony call including the network telephony identifier from a selected user device; providing access to the network telephony session for the selected user device in response to receipt of the network telephony call from the selected user device; and providing access to the audio for the selected user device through the network telephony session.

In certain embodiments, the physical computer storage of the preceding paragraph can include any subcombination of the following features, among others. For example, receiving the audio can include receiving the audio as digital audio from a signal processing module. Providing access to the audio can include streaming the audio to the user device using one or both of the following protocols: a real-time transport protocol (RTP) and a uniform datagram protocol (UDP). Further, the physical computer storage may be in combination with a computer system including computer hardware.

In certain embodiments, a method of streaming an audio feed and secondary content to a user device can include: by a content server including physical computer hardware: receiving a request from a user device to access an audio feed for streaming, the audio feed associated with a corresponding video; wirelessly streaming the audio feed to the user device via a Voice over IP (VoIP) conference call; identifying a feed characteristic related to the audio feed; supplying data related to the feed characteristic to an ad server along with a request for an advertisement; receiving the advertisement in response to the request; and transmitting the advertisement to the user device in response to receiving the advertisement, thereby providing a targeted advertisement related to the audio feed to the user device.

In certain embodiments, the method of the preceding paragraph can include any subcombination of the following features, among others. For example, identifying the feed characteristic can include identifying a keyword from caption text associated with the video. Identifying the feed characteristic can include identifying a keyword by converting speech in the audio feed to text. The method can also include identifying a second feed characteristic related to a second audio feed streamed to the user device prior to said streaming audio feed to the user. The method can also include supplying the second feed characteristic with the feed characteristic along with the request for the advertisement. The method can also include requesting a second advertisement related to the second feed characteristic. The method can also include identifying a user characteristic of a user of the user device. The method can also include supplying the user characteristic to the ad server along with the request for the advertisement. The user characteristic can include a location of the user. The user characteristic can include demographic information regarding the user.

In certain embodiments, a system for streaming an audio feed and secondary content to a user device can include: a server that can provide an audio feed to a user device using a Voice over IP (VoIP) protocol, the audio associated with corresponding visual content; and a secondary content server including computer hardware. The secondary content server can: identify a feed characteristic related to the audio feed, supply data related to the feed characteristic to an ad server along with a request for an advertisement, receive the advertisement in response to the request, and transmit the advertisement to the user device in response to receiving the advertisement, thereby providing a targeted advertisement related to the audio feed to the user device.

In certain embodiments, the system of the preceding paragraph can include any subcombination of the following features, among others. For example, the secondary content server can include a caption extractor that can extract captions from the visual content. The system can further include a signal processing module that can capture the visual content and submit at least a portion of the visual content to the secondary content server, the visual content including the captions. The secondary content server can also include a caption analyzer that can analyze the captions to identify a keyword associated with the captions. The secondary content server can also include a local ad server that can supply the keyword as the feed characteristic to the remote ad server. The secondary content server can include a speech-to-text converter that can extract text from the audio feed. The secondary content server can also include a text analyzer that can analyze the extracted text to identify a keyword associated with the extracted text. The secondary content server can also include a local ad server that can supply the keyword as the feed characteristic to the remote ad server. The secondary content server can provide access to a game related to the audio feed for the user device. The secondary content server can provide access to a local service for the user device. The local service can include one of the following: a taxi service, a restaurant ordering service, and a concierge service.

In certain embodiments, non-transitory physical computer storage can include instructions stored thereon that, when executed by one or more processors, implement components for streaming an audio feed and secondary content to a user device. The components can include: a first server that can provide an audio feed to a user device using a network telephony protocol, the audio associated with corresponding visual content; and a secondary content server that can: identify a feed characteristic related to the audio feed, supply data related to the feed characteristic to a third server along with a request for secondary content related to the feed characteristic, receive the secondary content from the third server in response to the request, and transmit the secondary content to the user device in response to receiving the advertisement.

In certain embodiments, the physical computer storage of the preceding paragraph can include any subcombination of the following features, among others. For example, the first server can receive an additional audio source. The first server can broadcast the additional audio source to the user device and other user devices, overriding the audio feed. The additional audio source can include one of the following: a local advertisement and a public service announcement.

In certain embodiments, a method of accessing an audio feed associated with a corresponding video can include: by a mobile device including a processor: establishing a wireless connection to a content server; obtaining a list of audio feeds available for streaming from the content server; outputting a graphical user interface for presentation to a user, the graphical user interface including user interface controls that can represent the list of audio feeds; receiving a user selection of one of the audio feeds through the graphical user interface; in response to receiving the user selection of the selected audio feed, establishing a Voice over IP (VoIP) conference call with the content server using a conference call identifier that can identify the selected audio feed; and receiving streaming access to the selected audio feed through the VoIP conference call.

In certain embodiments, the method of the preceding paragraph can include any subcombination of the following features, among others. For example, establishing the VoIP conference call with the content server can include connecting to the VoIP conference call as a muted participant. The method may also include receiving a web page including instructions for downloading a mobile application that can implement said obtaining the list of audio feeds, outputting said graphical user interface, said establishing the VoIP conference call, and said receiving the streaming access to the selected audio feed. Establishing the VoIP call can include initiating a session initial protocol (SIP) request to the content server. The VoIP call can implement any subset of the following protocols: a session initial protocol (SIP), a real-time transport protocol (RTP), and a uniform datagram protocol (UDP). The VoIP call can implement any subset of the following protocols: a real-time transport protocol (RTP) and a uniform datagram protocol (UDP). The VoIP call can implement the H.323 protocol.

In certain embodiments, a system for accessing an audio feed associated with a corresponding visual content can include: a content processor that can obtain a list of audio feeds available for streaming from a server; a user interface module that can output a graphical user interface including user interface controls that can represent the list of audio feeds and to receive a user selection of one of the audio feeds; and a Voice over IP (VoIP) client including computer hardware, the VoIP client that can initiate a VoIP session with the server in response to receipt of the user selection of one of the audio feeds and to receive streaming access to the selected audio feed through the VoIP session.

In certain embodiments, the system of the preceding paragraph can include any subcombination of the following features, among others. For example, the VoIP session can include a VoIP session identifier. The VoIP session identifier can be formatted according to a session initial protocol (SIP). The VoIP session identifier can include a reference to the audio feed. The VoIP session identifier can include a reference to a television associated with the audio feed. The VoIP client can initiate the VoIP session with the server as a muted participant. The system can also include a wireless module that can establish a wireless connection to the server.

In certain embodiments, non-transitory physical computer storage can include instructions stored thereon that, when executed by one or more processors, implement components for accessing an audio feed associated with a corresponding visual content. The components can include: a content processor that can obtain information about an audio feed available for streaming from a server in wireless communication with the content processor; a network telephony client that can initiate a network telephony session with the server to receive streaming access to the audio feed; and a user interface that can provide a user interface control that can adjust a characteristic of the audio feed responsive to an input of a user.

In certain embodiments, the physical computer storage of the preceding paragraph can include any subcombination of the following features, among others. For example, the user interface control can include a volume control. The user interface control can include a stop playback control. The user interface can include an advertisement. The user interface can identify a television channel associated with the audio feed. The network telephony client can also initiate the network telephony session using a VoIP protocol. The VoIP protocol can include one or more of the following: a session initial protocol (SIP), an H.323 protocol, a real-time transport protocol (RTP), and a uniform datagram protocol (UDP). The audio feed can include television audio. The audio feed can include live audio. The physical computer storage can also be in combination with a computer system having computer hardware.

BRIEF DESCRIPTION OF THE DRAWINGS

Throughout the drawings, reference numbers are re-used to indicate correspondence between referenced elements. The drawings are provided to illustrate embodiments of the features described herein and not to limit the scope thereof.

DETAILED DESCRIPTION

I. Introduction

Muting or lowering television audio can be very frustrating for patrons of establishments such as restaurants, bars, gyms, airports, hotel lobbies, conference rooms, and the like. However, due to the ubiquitous spread of mobile handheld devices, it is possible to stream television audio to individual listeners' mobile devices, allowing listeners to watch the video on any display and simultaneously listen to the audio with headphones (or mobile speakers). Such an arrangement can allow an establishment to continue to mute or lower television volume to avoid audio interference while allowing patrons to enjoy the full audio of any program in the establishment.

One major drawback of existing audio streaming systems is inadequate synchronization between the television video and audio stream, which can be very irritating for viewers. For example, in some systems, the audio may be delayed or out of sync with a speaker in a video, making it hard to follow the speaker's speech and moving lips together. These synchronization problems may arise from the use of streaming protocols such as TCP-based or HTTP-based protocols, which inherently have delays. Even existing UDP-based streaming protocols, which may have less delay than TCP-based protocols, may still have an unacceptable synchronization delay of about 1-3 seconds. Such delay is typically not a problem when streaming just audio because listeners are usually willing to wait for a few seconds for the stream to buffer, but a delay of 1-3 seconds between audio and television video can be jarring. Some systems attempt to address this synchronization problem by delaying the video to match the delay of the audio. However, because the underlying streaming protocols involved can have variable delay, delaying the video is an imperfect solution that can still result in synchronization errors.

This disclosure describes embodiments of systems and methods that use protocols and techniques that can stream audio from a video device to a separate device while reducing or eliminate audio/video synchronization errors. In some embodiments, these systems and methods use Voice over IP (VoIP) technology to stream audio to mobile devices with low latency, resulting in little or no user-perceivable delay between the audio stream and corresponding video presentation. As a result, users can enjoy both the audio and video of any video display in an establishment. In addition, the systems and methods described herein may be implemented in the home or other locations to allow viewers who may be hard of hearing to listen to audio clearly via headphones.

II. Example Television Audio Systems

Figure 1A:
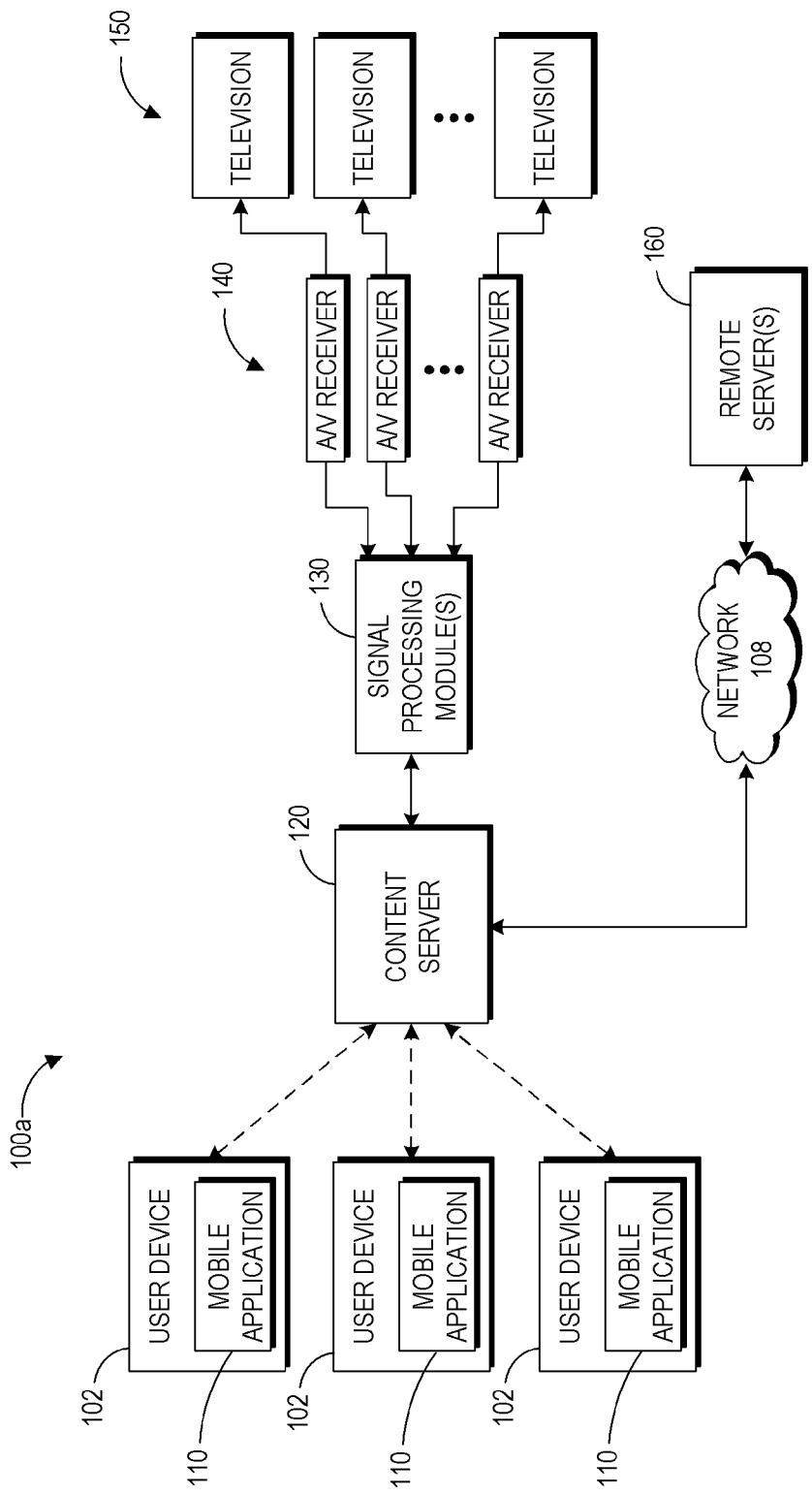
FIGS. 1A and 1B depict example embodiments of television audio delivery systems.
Figure 1B:
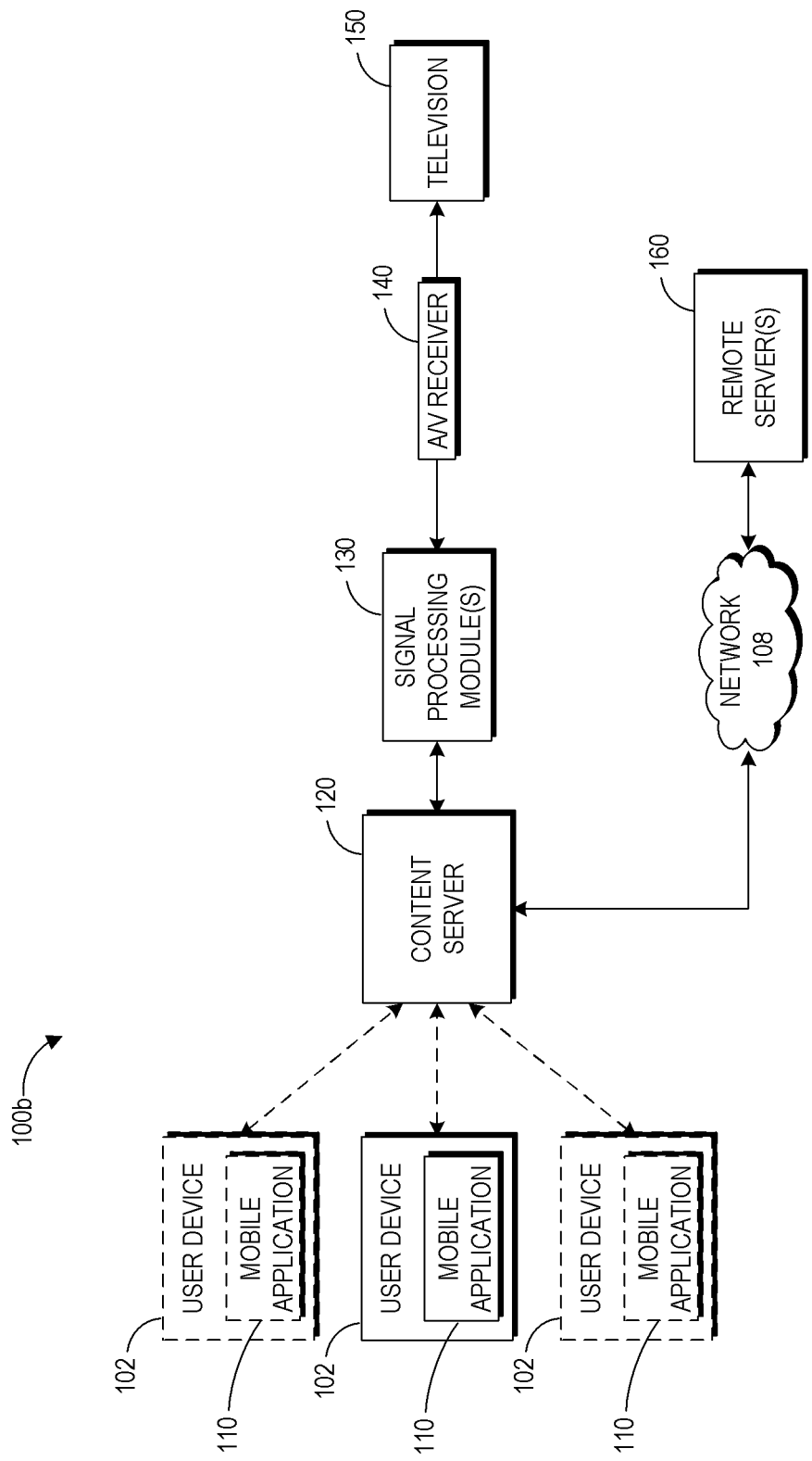

FIGS. 1A and 1B depict example embodiments of television audio delivery systems 100a and 100b (collectively, "100"). The television audio delivery systems 100 can provide users of mobile devices with access to audio for one or more televisions either in the users' homes or in business establishments or other public or private venues. Providing this access to television audio can enable users to hear the audio televisions in locations where televisions are typically muted or played at low volume due to a plurality of televisions being running at the single location. For example, the television audio delivery systems 100 can be implemented in a gym, restaurant, bar, sports bar, airport, theme park, doctors' offices waiting rooms, hospitals, dialysis treatment centers, and the like.

FIG. 1A, in particular, shows an embodiment of the television audio delivery system 100a where multiple televisions 150 are used, while the television audio delivery system 100b FIG. 1B includes a single television 150 that may be in a user's home, or hospital waiting room, for example.

Referring specifically to FIG. 1A, in the television audio delivery system 100a, user devices 102 have installed thereon mobile applications 110 that can access audio associated with one or more televisions 150. The user devices 102 can be any type of mobile computing device including, for example, phones, smartphones, tablet computers, tablet computers, MP3 players, watches, laptops, personal digital assistants (PDAs), computerized glasses or goggles, or more generally, any mobile device with a processor or a computing capability. The mobile application 110 can be implemented in a browser or as a standalone application, such as a mobile application that may be downloaded from an application store like the Apple™ App Store™ for iOS™ devcies or the Google™ Google Play Store™ for Android™ devices.

The mobile application 110 on a given user device 102 can connect wirelessly, as indicated by dashed lines, to a content server 120. The content server 120 can include hardware and/or software for providing content such as television audio to the user devices 102, for example, in real time. In certain embodiments, the content server 120 receives the television audio through signal processing modules 130 that receive the television audio from audio/visual receivers 140. The audio/visual (A/V) receivers can be, for example, set-top boxes, digital video recorders (DVRs), satellite cable receivers, Blue-Ray™ or other optical players, video game platforms (such as the Microsoft Xbox™, Sony Playstation 3 or 4™, Nintendo Wii™, or the like), digital broadcast receivers, or Internet television streaming devices, such as the Roku Box™ device or Apple TV™ device (or an another device with similar functionality) or the like. The A/V receivers 140 can provide audio and video to the televisions 150 and also audio to the signal processing modules 130. The signal processing modules 130 may receive, for example, analog audio from certain A/V receivers 140, convert this analog audio to digital audio and provide this digital audio to the content server 120. In addition, in some embodiments, the A/V receivers 140 receive digital audio and provide the digital audio to the content server 120.

The content server 120 can include hardware and/or software that delivering television audio to the mobile applications 110. In one embodiment, the content server 120 includes an access point for providing wireless (e.g., Bluetooth® or Wi-Fi) access to the user devices 102. The content server 120 can also include a network telephony system that facilitates delivering television audio to the mobile applications 110. For instance, this network telephony system can enable the content server 120 to connect to the mobile applications 120 via a voice-over IP connection. The content server 120 can host a conference call for each audio feed received from the A/V receivers 140, where each audio feed can correspond to the audio for a given TV. A conference call established by the content server 120 can provide access to one of the feeds associated with one of the televisions 150 to any number of the mobile applications 110 that connect to that conference call. Thus, the user devices 102 or mobile applications 110 can use voice-over IP protocols or other network telephony protocols to connect to conference calls hosted by the content server 120 to obtain access to the television audio.

One example benefit of using conference calls and network telephony technology on the content server 120 can be reduction in latency. As a result, the audio can be played on the user devices 102 with little user-perceived delay from the corresponding video output on the televisions 150. In contrast, existing technologies for audio streaming, such as HTTP- or TCP-based streaming, can provide a much longer delay that results in a frustrating out-of-sync presentation of audio and video to the users. Additional details about the conference call and VoIP embodiments that may be implemented by the content server 120 are described in greater detail below.

Network telephony technologies other than VoIP may be employed by the content server 120 in other embodiments. However, for convenience, this specification generally refers to VoIP as one example type of network telephony that may be implemented by the content server 120 to deliver television audio. Other terms commonly associated with VoIP, and which technologies may be implemented by the content server 120, include IP telephony, Internet telephony, voice over broadband (VoBB), broadband telephony, IP communications, and broadband phone.

Further, for convenience, this application refers primarily to the delivery of television audio from a content server to mobile devices. However, it should be understood that this audio can come from any video device, including any television, projector, computer monitor, mobile or fixed computing device, or the like. Thus, the term "television audio," as used herein, in addition to having its ordinary meaning, can include any audio associated with a corresponding video, whether delivered by a television or other device. Further, any type of visual content may be output by the content server 120, including video.

With continued reference to FIG. 1A, a remote server (or servers) 160 is also shown in communication with the television audio delivery system 100a via a network 108, which may be a local area network (LAN), a Wide Area Network (WAN, e.g., the Internet) at leased line, or some combination of the same. The remote server 160 can provide secondary content to the content server 120, which can in turn provide this content to the user devices 110 via the mobile application 110. The secondary content can include, for example, advertisements, games, web content, other applications, chat functions, social networking or social media content, or the like, more detailed examples of which are described below with respect to FIGS. 9 through 14.

As described above, the television audio delivery system 100b of FIG. 1B can be implemented in locations that a single television 150 (e.g., in a single room). The television audio delivery system 100b may be used in an individual home or in other areas that have a single television including some doctor's offices, hospitals, dialysis treatment areas, and the like, where people may be waiting for a period of time while watching television. The television audio delivery system 100b may also be used in areas with multiple televisions where television audio delivery service is available for a single television, such as some doctor waiting rooms that have a high volume television for children and a second television for adults. In this example scenario, the television with programming for adults may be configured with the television audio delivery system 100b.

In applications in the home, a user device 102 can connect to the content server 120 as in other locations. The content server 120 may be implemented as a set-top box that sits on top of or close to a television 150. One example purpose of using the system in the home can be to assist hearing for hearing-impaired listeners. Typically, hearing-impaired listeners turn television volume up very loudly to the point of annoyance of non-hearing impaired persons. It can therefore be beneficial to provide such hearing-impaired persons with access to the user device 102 with the mobile application 110 and headphones to listen in comfort while not disturbing others around him or her. However, it is becoming increasingly common to find multiple televisions in the home, even in the same room. Therefore, the television audio delivery system 100a of FIG. 1A could also be implemented in the home.

The content server 120 and other modules shown in FIG. 1B can have all of the same functionality described above with respect to FIG. 1A. In fact, multiple user devices 102 can be used to listen to the television 150 by different users with different headphones. Likewise, the television 150 may have the functionality to provide split-screen viewing and may show two different television shows or videos on a single screen, or more than two on a single screen. Such a split-screen arrangement is common, for example, in video gaming, where users may have up to four or more different segmented portions of a screen in a multi-player game setting.

Thus, in one embodiment, the television 150 (or the A/V receiver 140, which may be a video game platform) may provide two or more audio feeds to the content server 120 via the signal processing modules 130, each feed of audio corresponding to one split screen of the television display. Different listeners of the user devices 102 can access these different feeds via the content server 120. In this manner, users can watch different portions of a video game or even different television shows on the same television and receive different audio individually via headphones, without disturbing each other. Listening to different audio may be particularly valuable in video games, such as first-person shooters, where a user may glean information about opponents via audio that the user would not wish other users to hear. For example, in a football video game, a user might call a certain play and not wish to have other users hear that play being called, and can do so more discretely using this system 100b.

Figure 2A:
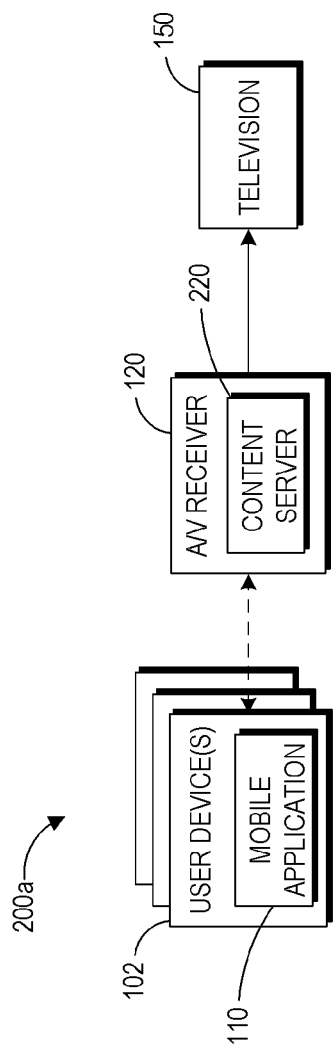
FIGS. 2A and 2B depict additional example embodiments of television audio delivery systems.
Figure 2B:
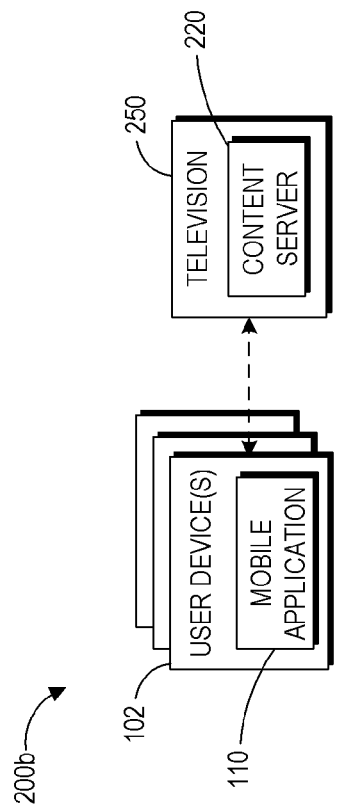

The television audio delivery systems 100a and 100b, shown in FIGS. 1A and 1B, can be modified in many different ways, but while still achieving the same or similar benefits described herein. For instance, in one embodiment, the content server 120 may be implemented directly in the A/V receiver 140 (see, e.g., FIG. 2A, with a content server 220 in an A/V receiver 240). In another embodiment, the televisions 150 can be Internet-enabled televisions or may have integrated cable or satellite television receivers within the televisions 150, and can therefore provide digital or analog audio directly to the content server 120. If digital audio is output by a television 150, the A/V receivers 140 may be omitted and the signal processing modules 130 may optionally be omitted. Thus, the televisions 150 can connect directly to the content server 120 (see, e.g., FIG. 2B, where a television 250 includes a content server 220 that connects to the user devices 102).

In still other embodiments, the A/V receivers 140 may receive digital signals instead of analog signals and can therefore send digital signals directly to the content server 120 instead of through the signal processing modules 130. The signal processing modules 130 may therefore be omitted.

Each of the different television audio delivery system configurations described above may be combined into a single television audio delivery system, where some televisions 150 provide digital audio directly to a content server 120, and where other televisions 150 connect to A/V receivers 140, which connect to the content server 120. Some A/V receivers 140 can be analog, while others may be digital. Similarly, some televisions 150 provide analog audio out while others provide digital audio out. Thus, any combination of the various television audio systems described above may be implemented in a given location or venue.

In addition to streaming television audio, the content server 120 may also stream any type of audio content, including live audio, recorded performances, audio associated with live events such as live plays or sporting events, including indoor or outdoor events, movie audio, home theater audio, sports betting audio, music (including at concerts), and the like. For convenience, the remainder of this specification refers generally to television audio, although it should be understood that any type of audio (including the examples given above), can be streamed by the systems and methods described herein.

III. Example Signal Processing Modules

Turning to FIGS. 3A through 3D, embodiments of signal processing modules 330 associated with a television audio delivery system are shown. In particular, FIGS. 3A through 3D include more detailed example embodiments of the signal processing module 130 of FIGS. 1A and 1B, namely the signal processing modules 330a-d. These signal processing modules 330 include various features that can enable analog and/or digital audio to be processed and provided to a content server 320. The content server 320 can have all of the functionality of the content server 120 described above.

Figure 3A:
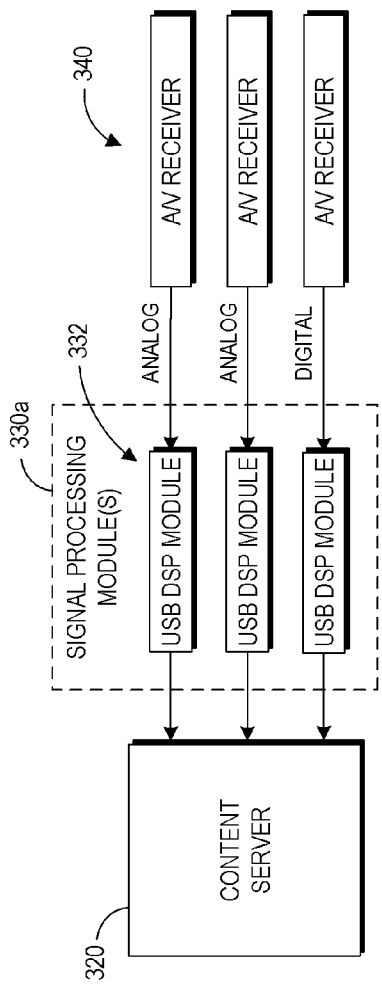
FIGS. 3A through 3D depict embodiments of signal processing modules associated with a television audio delivery system.

Turning specifically to FIG. 3A, the signal processing module 330a receives analog and digital audio from A/V receivers 340. The A/V receivers 340 can have all the functionality of the A/V receivers 140, described above. Although not shown, the signal processing modules 330a can receive analog or digital audio from the televisions 150 described above. In the depicted embodiment, the signal processing modules 330a include universal serial bus (USB) digital signal processing (DSP) modules 332. Each USB/DSP module 332 can connect to an A/V receiver 340 via a cable or the like to receive audio and can convert the audio to a format suitable for processing by the content server 320. The USB/DSP modules 332 can plug into USB ports in the content server 320.

Some examples of inputs that the USB/DSP modules 332 can receive include 3.5 mm jack audio inputs, RCA inputs, HDMI inputs, optical inputs, coaxial inputs, and the like. In one embodiment, the A/V receivers 340 output in one jack format, such as RCA or HDMI, to a cable that has a corresponding connector, and the other end of the cable may include a 3.5 mm jack that connects to the DSP module 332. Although shown as a USB/DSP module 332, the modules 332 may connect to the content server 320 using an interface other than USB, such as another serial interface, Firewire, a Lightning connector, or any other suitable connection.

Figure 3B:
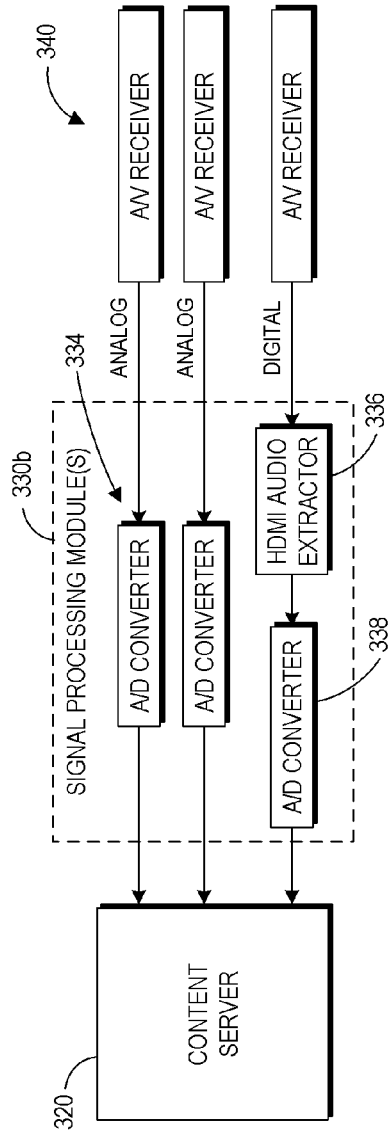

Referring to FIG. 3B, more detailed versions of the DSP modules 332 are shown in the signal processing module 330b. Each DSP module 332 may include an analog-to-digital converter 334, although as will be described below, some DSP modules 332 need not include an analog-to-digital converter 334.

The analog-to-digital converter 334 can receive an analog audio signal and convert it to a digital audio signal that can be processed by content server 320. Although not shown, each DSP module 332 may also include an audio enhancement module that enhances the digital output of the analog-to-digital converter 334 to make dialog or other vocals easier to understand for the listener, or which otherwise provide audio enhancements to the audio.

Another USB/DSP module 332 can include components that can interface with digital audio, for example, obtained from HDMI. Thus, for example, the DSP module 332 may include an HDMI audio extractor 336 and an analog-to-digital converter 338. HDMI, although in digital format already, interleaves both audio and video. In order to obtain the audio from an HDMI signal, an HDMI extractor or de-embedder 336 can therefore be employed. The output of this extractor or de-embedder can be an analog signal, which may be converted to digital format by the analog-to-digital converter 338 and provided to the content server 320. In another embodiment, the output of the HDMI audio extractor 336 is a digital audio signal that can be provided directly to the content server 320, allowing the analog-to-digital converter 338 to be omitted.

Although described herein as "DSP" modules 332, the modules 332 may in fact include just an ND converter 334 and not a digital signal processor chip. However, a digital signal processor chip may be included in any of the DSP modules 332 in various embodiments.

Figure 3C:
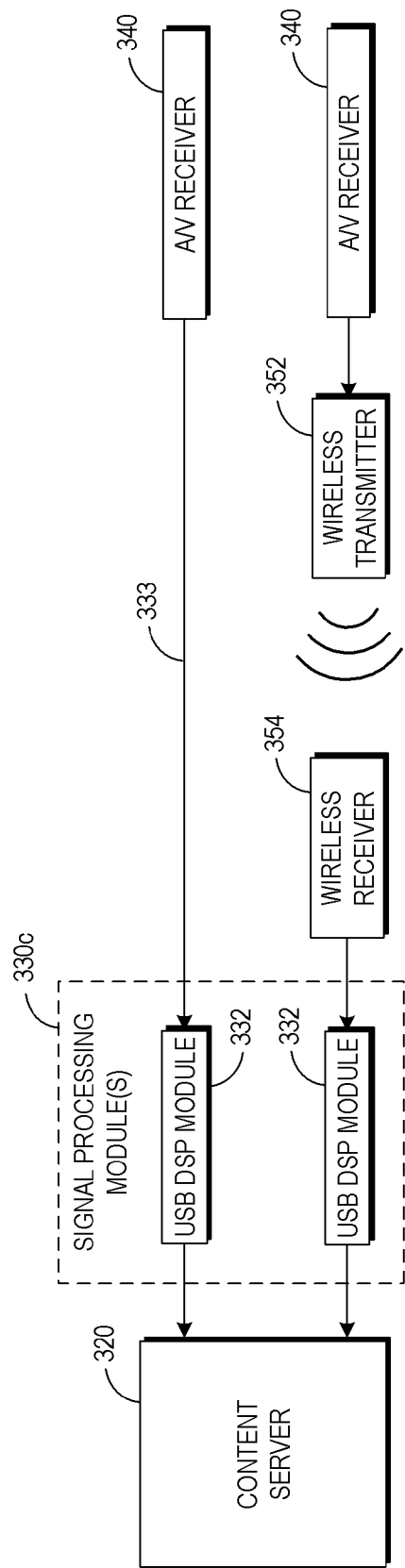

Referring to FIG. 3C, another embodiment of a portion of the television audio delivery system is shown having signal processing modules 330c that include the DSP modules 332 described above. However, one of the DSP modules 332 connects to an A/V receiver 340 with a cable 333, and the other DSP module 332 connects to a wireless receiver 354 that wirelessly receives audio and/or video data from a wireless transmitter 352 in communication with another NV receiver 340. The A/V receivers 340 can therefore be wirelessly coupled with the signal processing modules 330c and/or content server 320.

The purpose, in one embodiment, of having wireless communication from the A/V receivers 340 or, indeed, a television that may be directly providing audio, is that in a location with many televisions or a large building, the televisions may be located far from the content server 320. To avoid the clutter of numerous cables from the different televisions to the content server, it can be beneficial to wirelessly transmit the audio and/or video to the content server 320.

In one embodiment, the wireless transmitter 352 operates on a VHF or UHF frequency band to avoid interference with the 2.4 gigahertz Wi-Fi band that may be employed by the content server 320 acting as an 802.11x wireless hotspot. While only one of the A/V receivers 340 is shown communicating wirelessly with the content server 120 via the signal processing modules 330c, more or all of the televisions or A/V receivers can communicate wirelessly with the content server and/or signal processing modules, in some embodiments. Likewise, wireless communication between A/V receivers, televisions, content servers, signal processing modules, and the like, may be omitted in other embodiments.

Figure 3D:
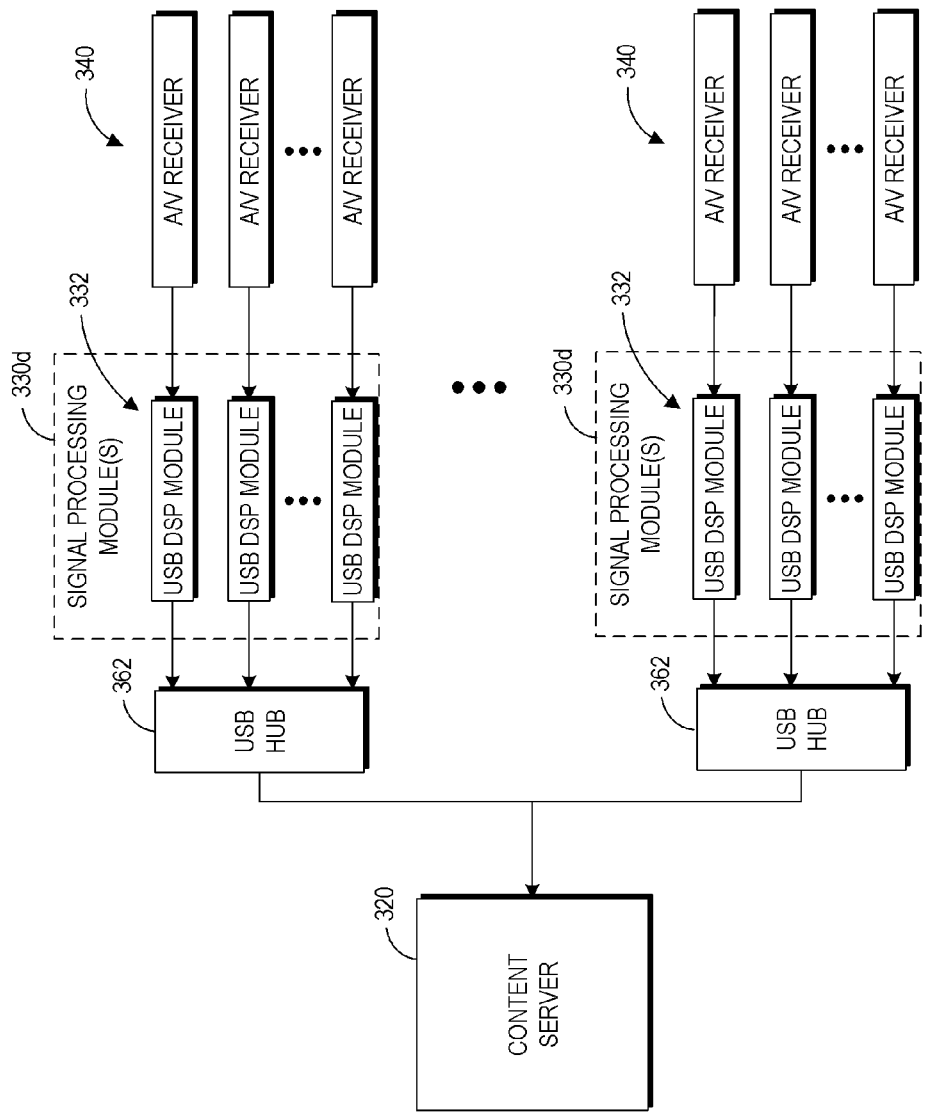

Turning to FIG. 3D, there are two sets of signal processing modules 330d shown, each set of signal processing modules 330d including USB/DSP modules 332 that provide signals to a USB hub 362. Two USB hubs are shown that can receive the signals and transmit them to the content server 320. Each USB hub 362 includes a single connection to the content server 320. Thus, each USB hub 362 can aggregate signals from multiple DSP modules 332, allowing an even greater number of televisions to connect to a single content server 320.

Any number of DSP modules 332 and, therefore, A/V receivers and/or televisions can connect to a USB hub 362, depending on the configuration of the USB hub 362. For example, 2, 3, 4, 8 or more DSP modules 332 can connect to any given USB hub 362, and any number of USB hubs 362 can connect to a given content server 320, depending on the number of USB ports available on the content server 320.

In another embodiment (not shown), each USB hub 362 can communicate wirelessly with the content server 320 instead, or any subset of the USB hubs 362 may communicate with the content server 320 wirelessly, either using Wi-Fi, Blue-Tooth™, VHF, UHF, or some other wireless protocol or set of protocols. Further, there may be multiple content servers 320 in any given location. For instance, several content servers 320 may be dispersed throughout a large building. An airport, for example, may have multiple content servers that are dispersed throughout the airport terminals.

In another embodiment, the content server 320 acts as a server only and not as an access point or wireless hotspot, but instead is connected to a wireless hotspot. There may therefore be multiple wireless hotspots that are connected to the content server 320 or 120, which hotspots can be spread throughout a location to provide better wireless coverage and access by user devices.

IV. Example Television Audio Delivery Processes

Figure 4:
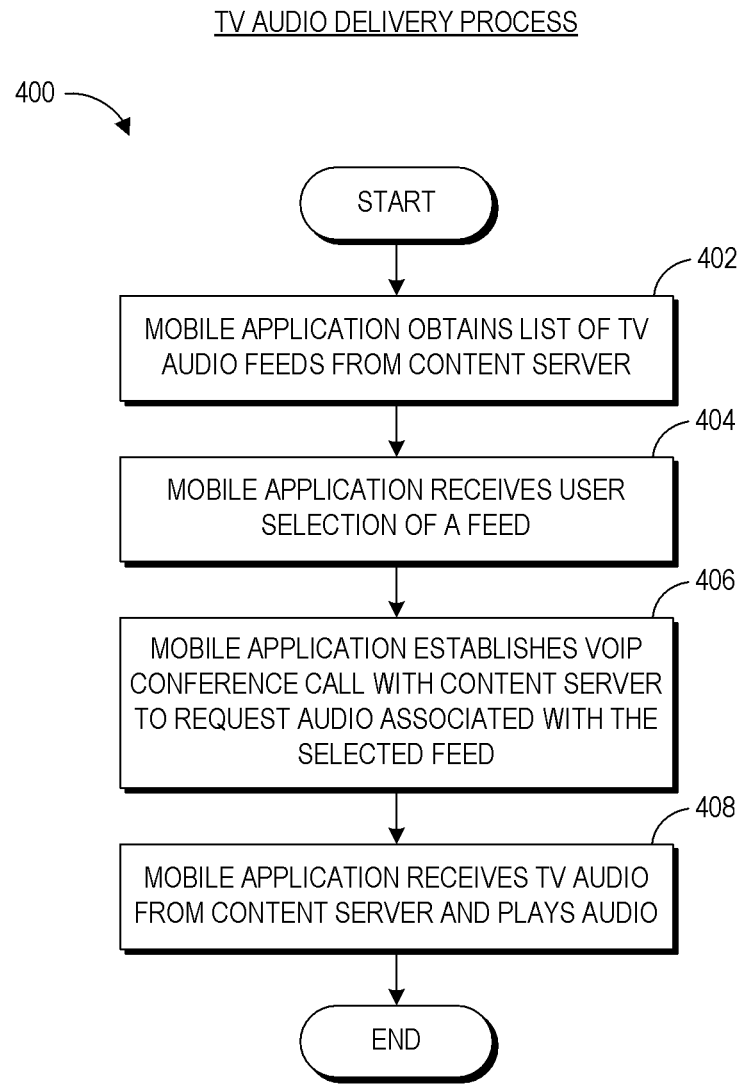
FIGS. 4 and 5 depict embodiments of television audio delivery processes.

Turning to FIG. 4, an embodiment of a television audio delivery process 400 is shown. The television audio delivery process 400 can be implemented by any of the television and audio delivery systems described herein. The process 400 illustrates an overview of a technique for delivering television audio to a mobile device using network telephony technologies such as VoIP. More detailed processes for delivering television audio to mobile devices are described in great details below with respect to FIGS. 5 and 6. The process 400 is described from the perspective of the mobile application 110, which has already been downloaded to a user's device 102 by the start of the process 400.

At block 402, the mobile application 110 obtains a list of television audio feeds from the content server 120. The mobile application 110 may display this list in a user interface of the mobile application 110. At block 404, the mobile application receives the user selection of a feed. The user may tap on a touch screen display of the user device 102, for instance, to select one of the displayed feeds. At block 406, the mobile application 110 establishes a VoIP conference call with the content server 120 to request audio associated with the selected feed. At block 408, the mobile application 110 receives the TV audio from the content server 120 and plays back the audio for a presentation to a user.

As described above, establishing a VoIP conference call using VoIP protocols can greatly reduce latency in hardware transmission as compared with existing audio streaming protocols. For example, in one embodiment, using VoIP to stream audio can achieve a latency of less than 100 milliseconds or even less than 70 milliseconds, which delay may be imperceptible or barely perceptible to a user. In contrast, other streaming techniques using HTTP and/or TCP can have latencies on the order of 1 to 3 seconds, which would cause a major lack of synchronization between the received audio and the video, which would be bothersome to many listeners.

It should be noted that in some embodiments, the television audio delivery systems and associated processes described herein can implement certain of the features described herein without using network telephony to deliver the audio. Instead, these embodiments can use other streaming techniques to stream the audio while achieving other advantages described herein.

Figure 5:
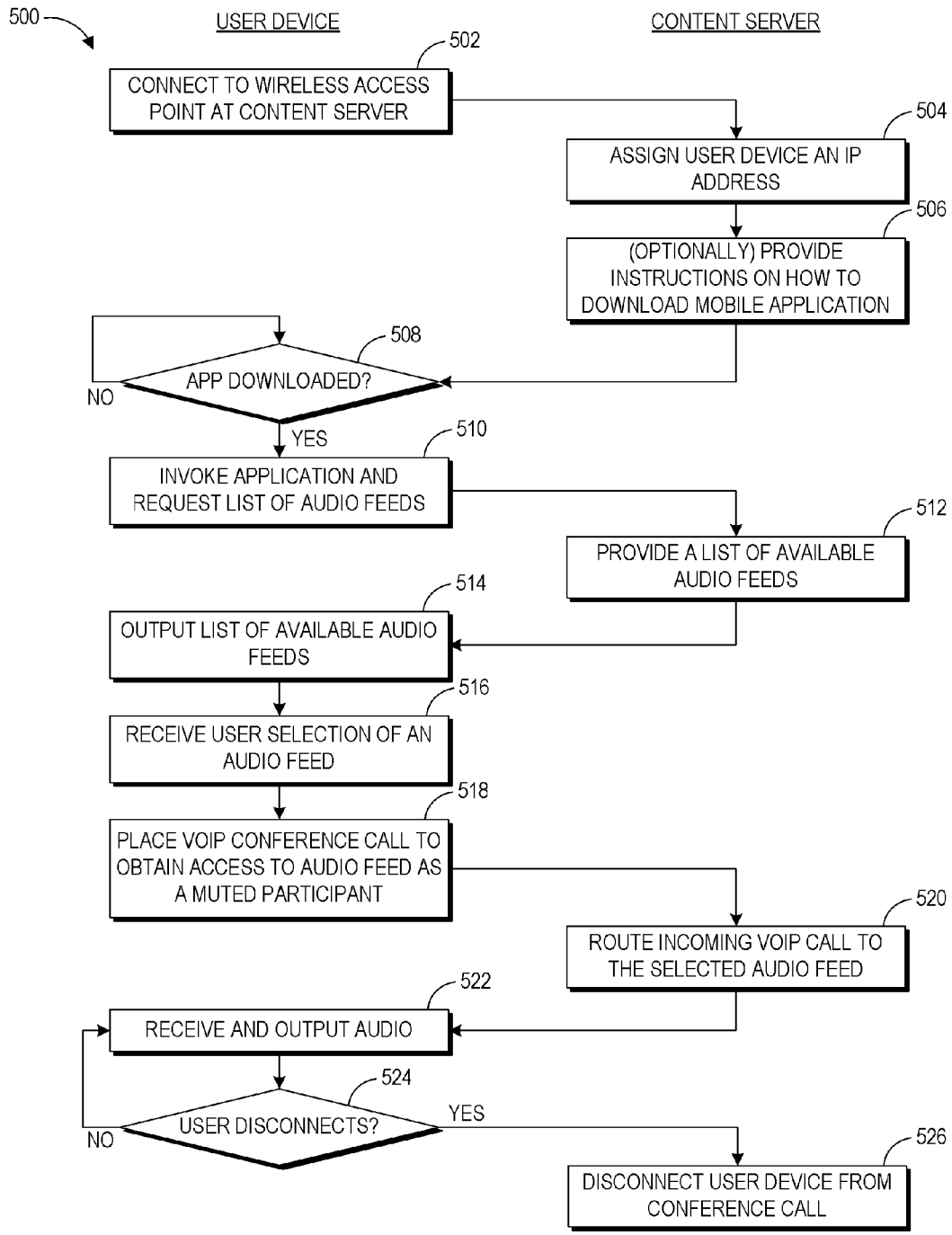

Turning to FIG. 5, a more detailed television audio delivery process 500 is shown. The process 500 is shown from the perspective of both the user device and the content server in a swim-lane diagram. Blocks on the left of the diagram can be implemented by the user device 102, and blocks on the right of the diagram can be implemented by the content server 120 (or 220, 320).

At block 502, the user device 102 connects to a wireless access point at the content server 120. Initially, for example, when a user discovers that an establishment includes a wireless hotspot, the user may connect to that hotspot attempting to obtain Internet access. The content server 120 can provide a splash page or the like to the user device 102 that informs the user of the purpose of the content server and that provides instructions for using the content server 120. Another way that the user may initiate connection with the content server 120 is to be informed at the location or venue that the location provides access to the services of a television audio delivery system. The user may be presented with information of how to access a wireless hotspot to download the mobile application 110.

At block 504, with the user connected to the wireless access point at the content server 120, the content server 120 can assign the user device 102 an internal IP address, for example, using a dynamic host configuration protocol (DHCP) server. The content server 120 optionally provides instructions to the user device on how to download the mobile application at block 506. For example, the content server 120 can serve a web page with instructions on how to download the mobile application from an application store or directly from the content server 120.

In an embodiment, advertising material that advertises the availability of a television audio delivery system at the location can include a machine-readable code, such as a QR code or other barcode that a user can scan with his or her user device 102. The QR code or other barcode may have a website link or link to an application store or other download location from which the user can download the mobile applications 110 to the user device 102.

In another embodiment, the user has already downloaded the mobile application 110 to the user device 102 and block 506 is skipped. For instance, the user may have used the mobile application 110 at this location or another location before and still have the mobile application 110 installed on his or her user device 102.

If the app is downloaded in block 508, then the application can be invoked and request a list of audio feeds at block 510. Otherwise, functionality cannot continue without access to the mobile application 110, and the process 500 remains at block 508 until the mobile application 110 is downloaded.

At block 512, the content server 120 can provide a list of available audio feeds to the user device. These audio feeds can be output on a display of a user interface of the mobile application of block 514. User selection of one of the audio feeds can be received at block 516. The mobile application 110 can place a VoIP conference call to gain access to the audio feed at block 518. In an embodiment, the mobile application gains access to the VoIP conference call as a muted participant. As the sole purpose of obtaining the audio feed may be to listen, it may be disturbing for viewers to finally participate in a phone conference conversation. However, optionally in some embodiments, the mobile device is not a muted participant, but instead users can freely talk into their phones with their friends or with others.

At block 520, the content server 120 routes the incoming VoIP call to the selected audio feed using conference bridging software or the like, as will be described in greater detail below with respect to FIG. 6. The audio is received and output at block 522 at the user device 102. It is then determined at block 524 whether the user disconnects and, if not, the process loops back to block 522. Otherwise, at block 526, the content server disconnects the user device from the conference call.

Figure 6:
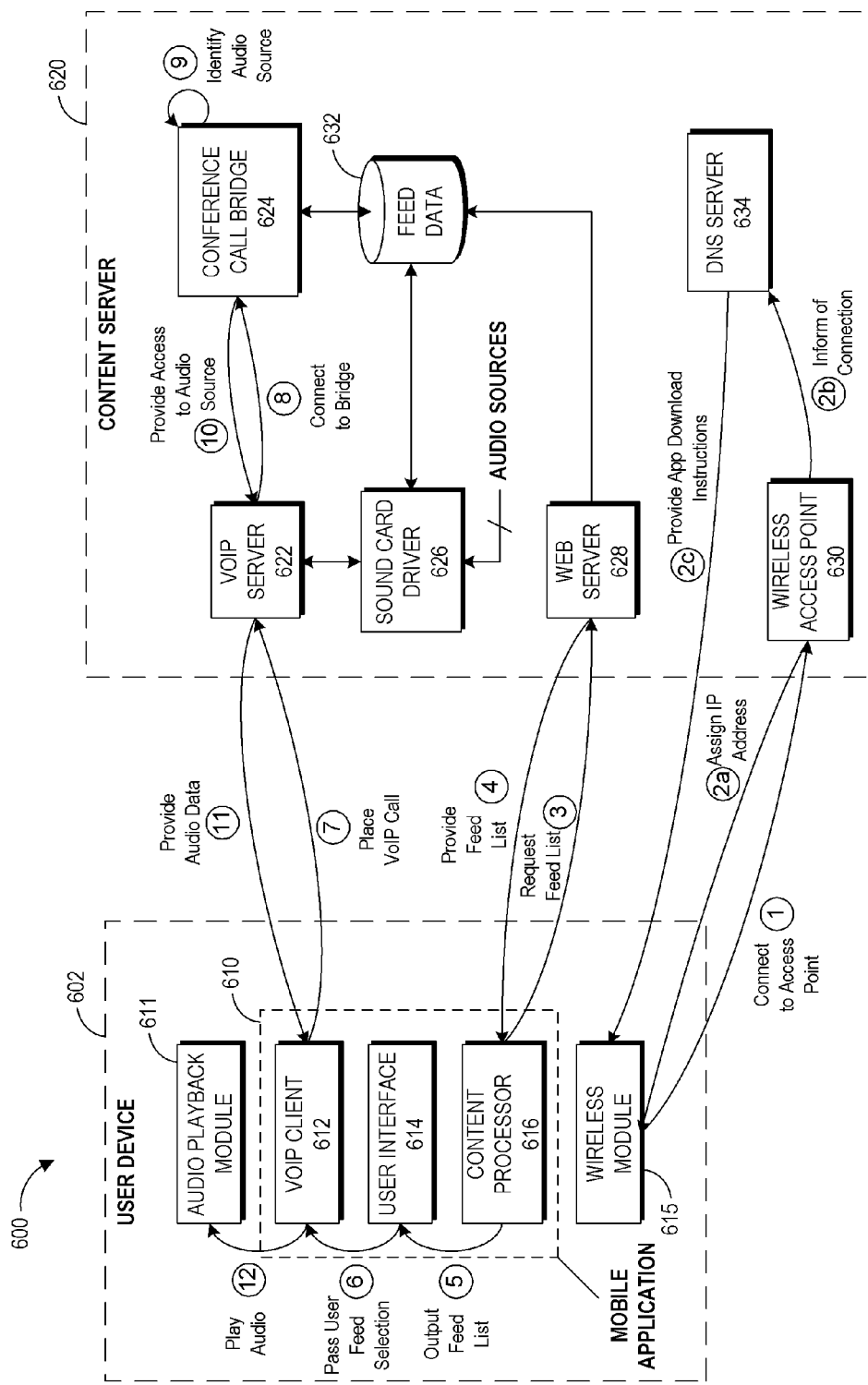
FIG. 6 depicts an embodiment of a state flow diagram for delivering television audio.

FIG. 6 depicts an embodiment of a state flow diagram 600 for delivering television audio in the context of example components of a user device 602 and a content server 620. The user device 602 and content server 620 are more detailed examples of the user device 102 and content server 120, 220, 320 described above. The user device 602, in particular, includes an audio playback module 611, a mobile application 610, and a wireless module 615. The mobile application 610 is an example of the mobile application 110 and includes a VoIP client 612, a user interface 614, and a content processor 616. Each of these components can be implemented in hardware and/or software. For instance, the mobile application 610 can run in one or more processors and may be stored in a memory or the like. The wireless module 615 may include a wireless antenna and a wireless circuit, including RF circuits, in addition to a processor. Likewise, the audio playback module 611 may include hardware and software, including the software to playback the audio such as codecs for decoding coded or compressed audio.

The content server 620 includes several components that can be implemented in hardware and software. These components are depicted examples that include a web server 622, a conference call bridge 624, a sound card driver 626, a web server 628, a wireless access point 630, a feed data store 632, and a domain name server (DNS) 634. By way of overview, the web server 622 can provide access to web protocols for the user device 602. The conference call bridge 624 can manage access to specific television audio sources that are provided through sound cards to the sound card driver 626. The web server 628 can provide access to feed data to determine which feed corresponds to which television or which audio that is stored, for example, in the feed data store 632 (which may include a database or flat file system), and the wireless access point 630 can include software as well as RF circuitry and an antenna to communicate with the user device 602. The DNS server 634 can provide information on how to download the mobile application 610 to the user device 602.

With continued reference to FIG. 6, the various states in state flow diagram 600 will now be described. At state 1, the wireless module 615 connects to the wireless access point 630 to obtain wireless access to the content server 620. At state 2a, the wireless access point 630 can inform the DNS server 634 of the access by the wireless module 615. The wireless access point 630 can also assign an IP address to the wireless module at state 2b so that the wireless module 615 can continue communicating with the content server 620. At state 2c, the DNS server 634 can optionally provide mobile application 610 download instructions to the user device 602, as described above.

At state 3, the content processor 616 of the mobile application 610 can request a feed list from the web server 628. The content processor 616 can send the request to an IP address that is stored or hard coded in the content processor 616, such as (for example) the private address 192.168.173.1:7770, which has a port designation of port "7770" on the content server 620. Upon receipt of this request for a feed list, the web server 628 can obtain the list from the feed data store 632 and provide the list to the content processor for 616 at state 4. The feed list may be formatted, for example, as a JSON or XML file that maps feeds to conference call identifiers or addresses (described below).

The content processor 616 can pass the feed list to the user interface 614 at state 5, which can allow the user interface 614 to output the list for user selection. Upon receipt of the user selection of a feed, the user interface 614 can pass this user selection at state 6 to the VoIP client 612. The VoIP client 612 can then place a VoIP call to the VoIP server 622 at state 7 using the conference call identifier corresponding to the selected feed in the feed list. The VoIP call may be placed to a VoIP address that is stored in the VoIP client 612 or that is obtained from the web server 628. The VoIP client 612 can use any VoIP protocol, including the session initiation protocol (SIP), H.323, or the like. For example, in one embodiment, the VoIP client 612 uses a SIP protocol over the real-time transport (RTP) protocol, which can be operated over a uniform datagram protocol (UDP) in the network layer of the OSI model. SIP and H.323 are merely examples of signaling protocols that may be implemented by the VoIP client 612, while RTP and UDP are merely examples of transport protocols that may be implemented by the VoIP client 612.

In an embodiment, the VoIP client 612 modifies the VoIP address of the corresponding VoIP server 622 to refer to the selected feed or selected TV. For instance, a general format of a VoIP address using a certain protocol might be similar to the following: SIP:TV<ID>@192.168.173.1:7770. The <ID> field in this address may be replaced with the ID of a feed or television that has been selected by the user. Thus, the address can be modified as follows (for a selection of TVC number "3"): SIP:TV3@192.168.173.1:7770.

The VoIP server 622 receives the incoming call and connects to the conference call bridge 624 at state 8. The conference call bridge 624 can identify the corresponding audio source that matches the requested feed in the address dialed by the VoIP client 612. For example, the conference call bridge 624 can access the feed data store 632 to identify a dial plan that may include, for example, a list of mappings of conference call identifiers to audio feeds. Once the feed is identified, the conference call bridge 624 can provide access to the audio feed at state 10, for example, by instructing the VoIP server 622 which audio source to access through the sound card driver 626. The VoIP server 622 can route access to this selected sound source and provide the audio data to the VoIP client 612 at state 11. The VoIP client 612 can hand off the audio to the audio playback module 611 at state 12 for playback and listening by the user.

In certain embodiments, the wireless access point 630 can be an unsecured hotspot so that users of the user device 602 do not need to log in to the wireless access point 630 for convenience. Security may therefore not be necessary, or minimal security may be used, because in certain embodiments, the wireless access point 630 does not provide Internet access to the user device 602. In other embodiments, certain Internet access may be provided, and a log-in or security mechanism may optionally be used by the wireless access point 630. For example, the wireless access point 630 may provide access to a limited number of websites, including a website instructs the user how to download mobile application 610. The wireless access point 630 may also have access to the Internet for other purposes including providing secondary content to the mobile application 610, which will be described in greater detail below with respect to FIG. 9.

Any VoIP software can be used to implement the VoIP client 612 or VoIP server 622. One example of VoIP software that may be used is available from Linphone™. Likewise, any conference conference call bridge software can be used to implement the bridge 624, one example of which is available from Freeswitch. The content server 620 can be implemented using any operating system, one example of which is Linux. For example, the Linux Mint distribution can be used as a lightweight distribution to implement the content server 620, although many, many other distributions or other types of operating systems may be used. In the Linux operating system, the sound card driver 626 can be the ALSA driver, and the web server 622 may be the Apache web server. However, many other types of components and software nodules may be used in place of those described.

Furthermore, in certain embodiments, the audio feed provided from the VoIP server 622 to the VoIP client 612 can be persistent. If a time out or other issue occurs with the connection, the VoIP server 622 or the VoIP client 612 can reinitialize the connection and reconnect to the stream. For example, the web server 622, if it detects a problem with the audio stream, can reinitialize the connection for other listeners on the stream to reconnect these listeners or their user devices 602 to the web server 622.

Further, as an additional embodiment or alternative to VoIP, in one embodiment the mobile application 610 can communicate with the content server 620 or for UDP, or a combination of UDP and RDP, without using a SIP H.323 or other VoIP protocol.

In other embodiments, the conference call bridge 624 may be omitted. Instead, the VoIP server 622 can directly access the feed audio from the feed data repository 632 and provide the feed audio to the VoIP client 612. For example, the VoIP server 622 can establish a separate VoIP call with each user device 602 that accesses the VoIP server 622, instead of a conference call that joins multiple user devices 602. In such embodiments, the audio feeds may be stored in the feed data store 632 together with corresponding VoIP session identifiers. The VoIP client 612 can therefore access the VoIP server 622 using a desired VoIP session identifier corresponding to the user's selected audio feed, resulting in the VoIP server 622 establishing a VoIP session with the VoIP client 612 to deliver the audio. In another embodiment, the VoIP server 622 can broadcast, unicast, multicast, or otherwise provide the audio to the VoIP client 612. In yet another embodiment, the VoIP client 612 accesses channels in the VoIP server 622, each channel corresponding to a feed of audio. For instance, the channels can be audio chat channels, although they may be muted on the mobile application 610 side. The VoIP server 622 can also use an intercom-like format to deliver audio to the mobile application 610. More generally, the VoIP server 622 can establish any type of VoIP session with the VoIP client 612, including UDB-based, RTP-based, real-time streaming protocol (RTSP) based, web-browser based, or other types of VoIP sessions.

The VoIP server 622 is one example of a network telephony server. The user device 602 can communicate with the content server 620 using any form of network telephony, including network telephony other than VoIP. For example, the mobile application 610 can establish a network telephony session with the content server 620 using any of a variety of network telephony protocols. In addition, the user device 602 can implement some or all the mobile application 610 features using a web browser instead of or in addition to a standalone mobile application.

In some embodiments, the content server 620 does not record or buffer the audio feeds for playback to the mobile application 610. Instead, the content server 620 delivers the audio in real time to the mobile application 610. The content server 620 may therefore be considered to deliver live audio to the mobile application 610 in some embodiments. Buffering may not be needed because of the low-latency delivery of the audio facilitated by embodiments of the VoIP or other network telephony solutions. However, in other embodiments, the content server 620 and/or the mobile application 610 can perform at least some buffering. Buffering can be used to fine-tune synchronization between the audio feed and the video to avoid substantially any dubbing errors. To perform buffering, in one embodiment the content server 620 saves or buffers at least a portion of the audio (and/or video) and synchronizes the audio delivery in time with the video. The mobile application 610 may also buffer at least a portion of the audio.

V. Example Mobile Application User Interfaces

Figure 7A:
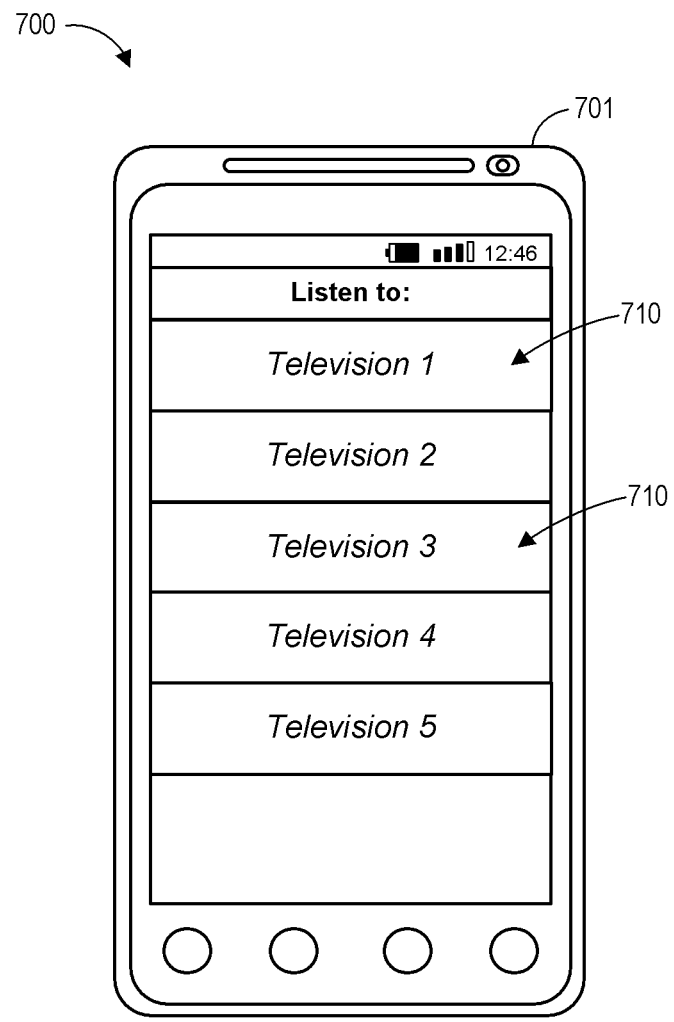
FIGS. 7A, 7B, and 8 depict example mobile application user interfaces.
Figure 7B:
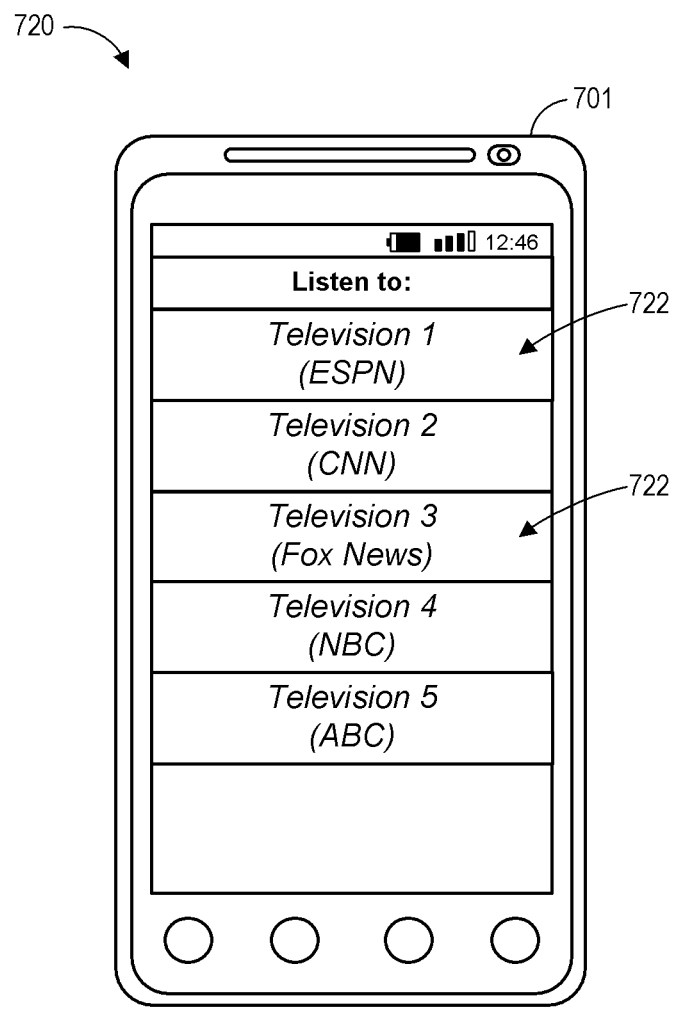
Figure 8:
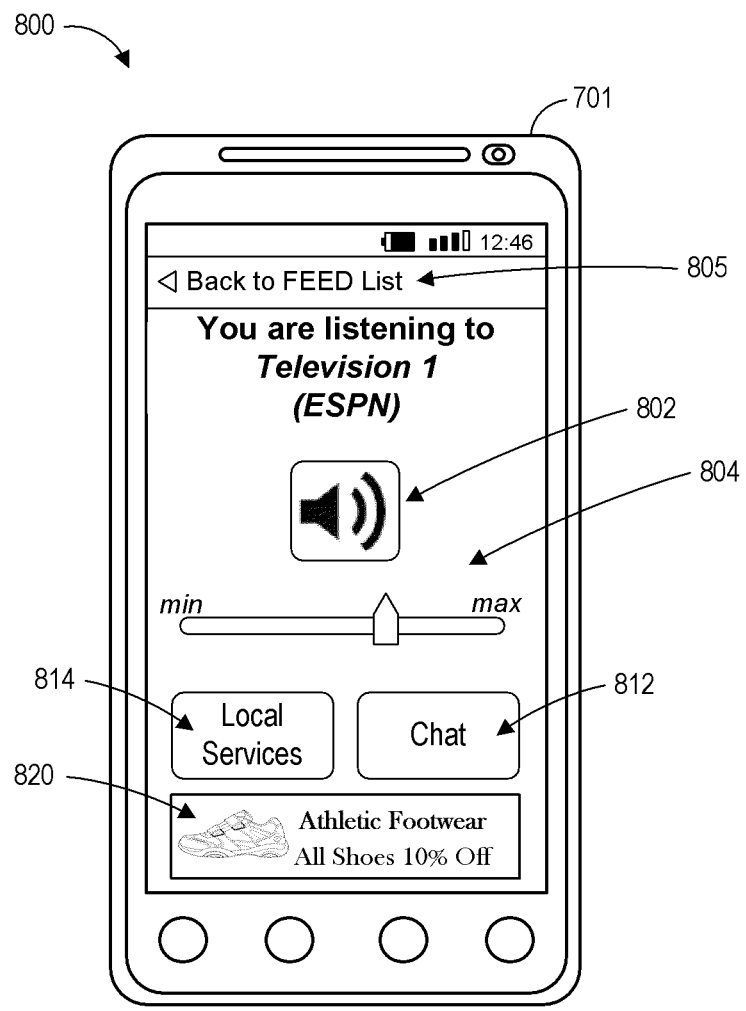

FIGS. 7A through 8 depict example user interfaces of a mobile application, such as any of the mobile applications described above. These user interfaces are just examples and may be varied in several embodiments. Each of the example user interfaces shown are depicted as being output by a mobile phone 701, which is an example of the user devices 102, 602 described above. The mobile phone 710 may have a touch screen or the like that allows a user to select user interface controls via touch or a stylus, or a combination of the same. However, it should be understood that the mobile application need not be implemented in a mobile phone in some embodiments. Instead, in some embodiments, the mobile application can be implemented in a web browser or in any device such as a tablet, laptop, or the like. Further, the mobile application can be implemented in a web browser on a mobile phone as well.

In FIG. 7A, a user interface 700, is shown on the mobile phone 701. In the user interface 700, users are presented with several audio feeds 710 to choose from. In the depicted embodiment, these feeds 710 (or feed user interface controls) are listed as televisions, including televisions 1 through 5, which may correspond to televisions that are numbered in an establishment to enable users to easily access the corresponding audio. FIG. 7B shows another embodiment of a user interface 720, where in addition to showing the television number and the feeds 722, that particular channel on the television is also shown (including ESBN, CNN, etc.).

FIG. 8 shows another example mobile application user interface 800 on the mobile device 701 that can be displayed in response to a user selecting one of the feeds from FIG. 7A or 7B. In this embodiment, the user has selected the feed corresponding to television 1 with the channel ESPN as indicated in the first portion 802 of the display. Volume control and stop buttons 802, 804 are also shown to enable user to control the volume of the audio and also to control whether to stop the audio from being played. In certain embodiments, the stop button 804 is not equivalent to a pause function because when the stop button 804 is released and playback resumes, the stream may commence at the point that the television is currently playing at rather than the point in time when audio playback stopped. A back button 805 allows the user to return to the feed list shown in either FIG. 7A or 7B.

Also shown are buttons 812 and 814 that provide additional services. The button 812 provides access to a chat service that allows, in certain embodiments, the user to have a text chat or a voice chat with other users that, for example, may be friends with the user in a social networking sense. Alternatively, the user may select the chat button 812 to chat with anyone listening to the same feed. The local services button 814 can provide access to various services, such as a taxi service to call a cab, ordering services to order food from the menu of a local establishment's restaurant or from other restaurants in the area, flagging or requesting a waiter, making reservations, offering feedback (such as suggestions/complaints/positive feedback), viewing a menu, splitting a tab, paying for a meal or other services, combinations of the same, or the like. In addition, an example advertisement 820 is shown that may be selected by the user. The generation of display of the ad 820 will be described in greater detail below. Other interactive content not shown may also be displayed on the display 800 including, for example, video game content that may or may not be relevant to the feed being listened to by the user, interactive voting content for voting along with the television show being watched by the user, and the like.

VI. Secondary Content Embodiments

Figure 9:
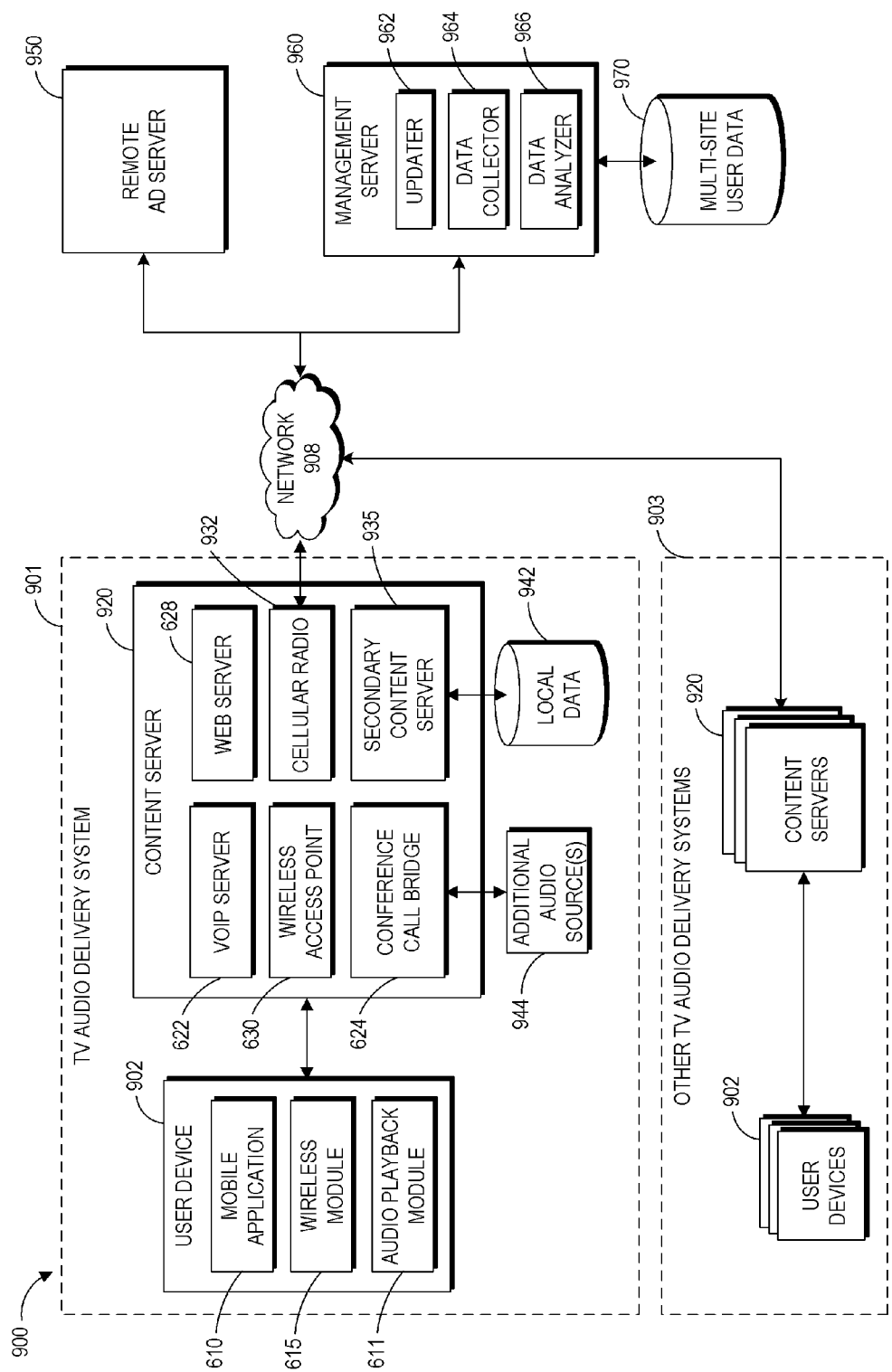
FIG. 9 depicts an embodiment of a computing environment including multiple television audio delivery systems.

Turning to FIG. 9, another embodiment is shown of a computing environment 900 that includes television audio delivery systems 901, 903. The television audio delivery system 901 includes many of the features of the television audio delivery systems described above as well as additional features. In the depicted embodiment, the television audio delivery system 901 includes a content server 920 having any of the features of the content servers described above, as well as a single example user device 902 connecting to the content server 920. The single user device 902 is shown for illustration purposes only; it should be understood that multiple user devices 902 may connect with the content server 920.

The computing environment 900 also includes other television audio delivery systems 903 that include content servers 920 and user devices 902. Each audio delivery system 901, 903 represents an individual location, venue or place such as a building or business where a television audio delivery system is implemented. Thus, there may be multiple such television audio delivery systems spread around a geographical area, any subset of which can communicate with one another via a network 908. The network 908 may be the Internet, a WAN, LAN, leased line, combinations of the same, or the like. In addition, additional servers are shown including a remote ad server 950 and a management server 960, which are examples of the remote servers 160 described above and which will be described in further detail below.

The content server 920 and the user device 902 of the audio delivery system 901 include many of the modules described above including, for example, in the content server 920, the VoIP server 622, the web server 628, the wireless access point 630, and the conference call bridge 624. Other features from the content servers described above may also be included, like the DNS server 634. Likewise, the user device 902 includes the mobile application 610, the wireless module 615 and the audio playback module 611. In addition, the content server 920 includes a cellular radio 932 which can include functionality for communicating with the management server 960 and/or remote ad server 950 and/or other local networks 903 via the network 908. In other embodiments, the content server 920 includes a wired modem or the like that communicates with the network 908 instead of (or in addition to) a cellular radio 932.

In certain embodiments, it can be useful to have a cellular radio 932 in the content server 920 (or in communication with the content server 920) because it can be useful to have access to the network 908 for a variety of functions. For instance, it could be useful for a central office or organization that operates the management server 960 to be able to update or maintain software features on the content server 920. Accordingly, the management server 960 includes an updater module 962 that can enable maintenance to be performed remotely on the content server 920. Likewise, it can be useful to obtain ad content for users of the user devices 902 via a remote ad server 950 over the network 908. While it is possible to connect the content server 920 with the local Internet network of the establishment or place in which the content server 920 is located, doing so can be cumbersome technically due to the typically required coordination with the local IT department of the establishment that hosts the content server 920. Thus, having a cellular connection or other wireless connection to the management server 960 and/or remote ad server 950 (and in general the network 908) can be beneficial. The cellular connection through the cellular radio 932 may, for example, be a 3G or 4G wireless connection or the like.

The content server 920 also includes a secondary content server 935 that can include hardware and/or software for providing secondary content to the user device 902. For example, the secondary content server 935 can provide ads, interactive games, interactive voting functionality for voting along with television shows, local services as described briefly above with respect to FIG. 8, social media functionality such as the ability to chat with friends as described above or to make Facebook™ or Twitter™ postings or the like. The secondary content server may store information about users of the user devices 902 and a local user data store 942 for the purpose of obtaining targeted ads for users as well as for other purposes.

The secondary content server 935 can communicate with the remote ad server 950 over the network 908 and through the cellular radio in an embodiment to obtain ads for users of the mobile devices. In certain embodiments, these ads can be targeted based on the particular audio feed or channel that a user is listening to and observing on a television (not shown). Detailed embodiments for generating such advertisements are described in subsequent figures. In other embodiments, the secondary content server 935 does not necessarily perform the processing used to generate requests for ads from the remote ad server 950. Instead the management server 960 performs data collection using a data collector 964 of user data from one or more television audio delivery systems 901, 903 and analyzes the data using a data analyzer 966 to mine the user data for the purpose of generating or requesting ads from the remote ad server 950.

The management server 960 can store user data in a multi-site user data repository 970, which can advantageously track data for the same user of a user device 902 in multiple networks 901 and 903. For example, if a user visits multiple different locations that include a television audio delivery system 901, 903 such as described herein, the user interactions of that user with the television audio delivery system 901, 903 can be tracked and that data stored by the data collector 964 in the multi-site user data store 970. The listening and viewing habits of that user and other users may be analyzed over multiple sites by the data analyzer 966 to obtain more fine-grained and particular information about those users to obtain more relevant ads for those users from the remote ad server 950.

In some alternative embodiments, the remote ad server functionality of the remote ad server 950 is subsumed or contained within the management server 960, which may generate its own ads without the aid of a remote ad server 950. Further, the secondary content server 935 can generate ads together with, in addition to or in place of the functionality of the remote ad server 950.

Also shown within the local network 901 is an additional audio source 944. The additional audio source 944 can come from within (or even outside of) an establishment hosting the local network 901 and may include, for example, an audio input by a person (e.g., employee or patron) at the establishment. For example, a microphone may be provided that can plug into or wirelessly communicate with the content server 920, which can enable a person to make an announcement that is transmitted to some or all listeners and users of the mobile application 610. The additional audio source 944 can communicate directly with the conference call bridge 624 which, upon receipt of audio from the additional audio source 944, can broadcast the audio to some or all users of the mobile application 610 and different user devices 602 or 902. A worker in an establishment may, for instance, want to advertise to some or all listeners that a special is being offered currently, for example, at a bar or at a restaurant. The additional audio source 944 can also include music such as from a jukebox or a jukebox application that is implemented on the content server 920 or in another computing system. The additional audio source 944 may also be used for public safety announcements in a particular area. For instance, in an airport, hotel or hospital a safety announcement may be announced to all listeners, etc. It should also be noted that the management server 960 and/or the remote ad server 950 can be implemented in a Software-as-a-Service platform or cloud-based platform such as Amazon AWS™ or Microsoft Azure™ platforms.

In one embodiment, the additional audio source 944 can communicate with an interactive voice response (IVR) system in the content server 920. For instance, a user can interact with a voice prompt menu in the IVR system to provide audio data to the conference call bridge 624. The IVR system can perform text-to-speech conversion that receives input text from a keyboard, mobile device, or the like, and that converts this text to speech. The IVR system may be implemented by the conference call bridge 624 in an embodiment as a phone number that a user can dial into the content server 920. Thus, the additional audio source 944 may be omitted in certain embodiments. In another embodiment, the audio source 944 is a prerecorded message, or the content server 920 can output a user interface that enables a user to select from prerecorded messages to output via the conference call bridge 624. The user can initially record these messages for storage at the content server 920 and subsequent broadcasting to listeners.

In yet another embodiment, the conference call bridge 624 or another aspect of the content server 920 can provide a module or user interface that enables a user to type or dictate text that can be broadcast to the listeners or users of the mobile devices 902. In an embodiment, the user can select which conference call or calls (or all conference calls) in which to broadcast the additional audio, e.g., via the user interface.

Figure 10:
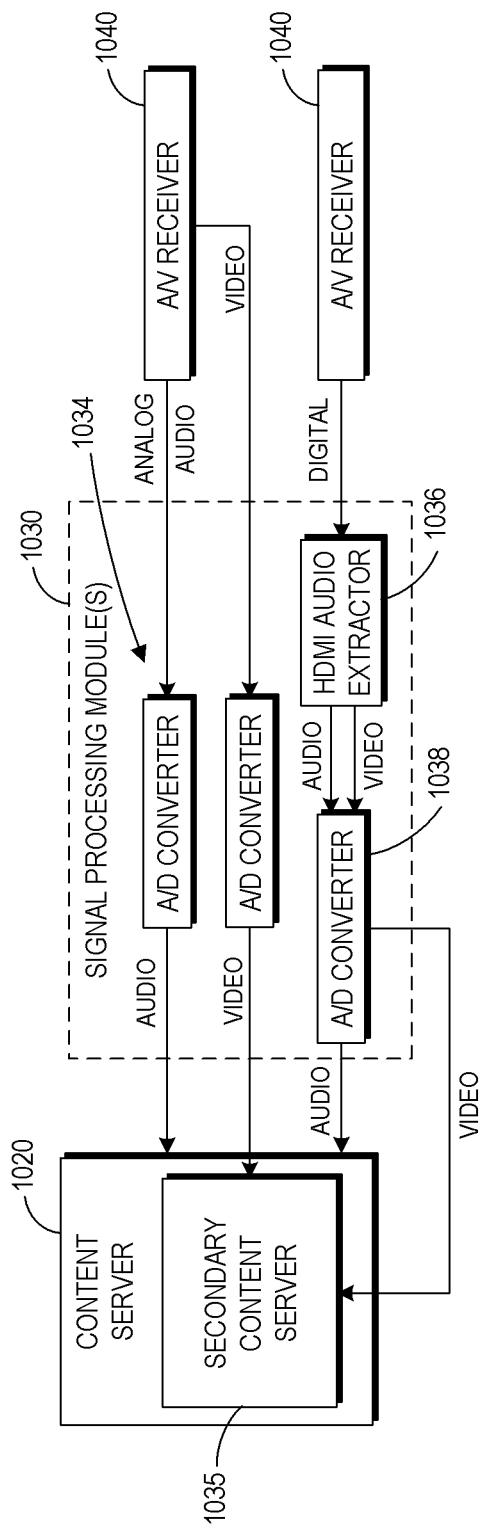
FIG. 10 depicts another embodiment of signal processing modules associated with a television audio delivery system.

Turning to FIG. 10, a portion of the television audio delivery system 900 is shown with the content server 1020 representing the content server 920. A portion of the content server 1020 is shown, including the secondary content server 1035. In addition, the content server 1020 is in communication with signal processing modules 1030, which can include all the functionality of the signal processing modules described above. These signal processing modules 1030 are further in communication with AV receivers 1040, which also can have the same functionality of the AV receivers described above. FIG. 10 illustrates how the secondary content server 1035 may obtain information useful for discerning what type of feed or channel that a user is currently listening to and for obtaining a relevant ad targeting information for the users listening to that feed or channel.

In addition to outputting audio, whether analog or digital, the AV receivers 1040 can also output video to the signal processing modules 1030 in one embodiment. For example, the signal processing modules can include analog to digital (ND) converters 1034, one of which might receive audio and another of which might receive video. It should be understood that the same ND converter 1034 might include multiple ports for receiving multiple audio inputs or audio and/or video inputs. The audio is provided to the content server 1020, and the video may be provided directly to the secondary content server 1035. A video may also be extracted from a digital signal provided to an HDMI audio extractor 1036, which may provide analog, audio and video to an A/D converter 1038 which provides the audio to the content server 1020 and the video to the secondary content server 1035. Video may be extracted directly from a digital signal provided from the AV receiver 1040 in one embodiment.

In certain embodiments, the second content server 1035 may extract captions that are included in the video, whether they be live captions or subtitles. The second content server 1035 may extract the captions from a separate file that is included in the video stream or may use signal processing techniques to obtain the captions from the video using digital image processing techniques, for example, to detect the lettering and so forth that is in the video. These algorithms or techniques may, for example, process the video to detect the text in an expected area of the images of the video and so forth. These captions can be analyzed by the secondary content server 1035 to determine a type of content that is being listened to by a listener or being watched by a viewer for the purpose of finding targeted ads to present to a user. Likewise, audio may be provided directly to the secondary content server 1035 for performing a speech-to-text conversion and subsequent analysis for providing targeted ads to users, as will be described in greater detail below.

Figure 11A:
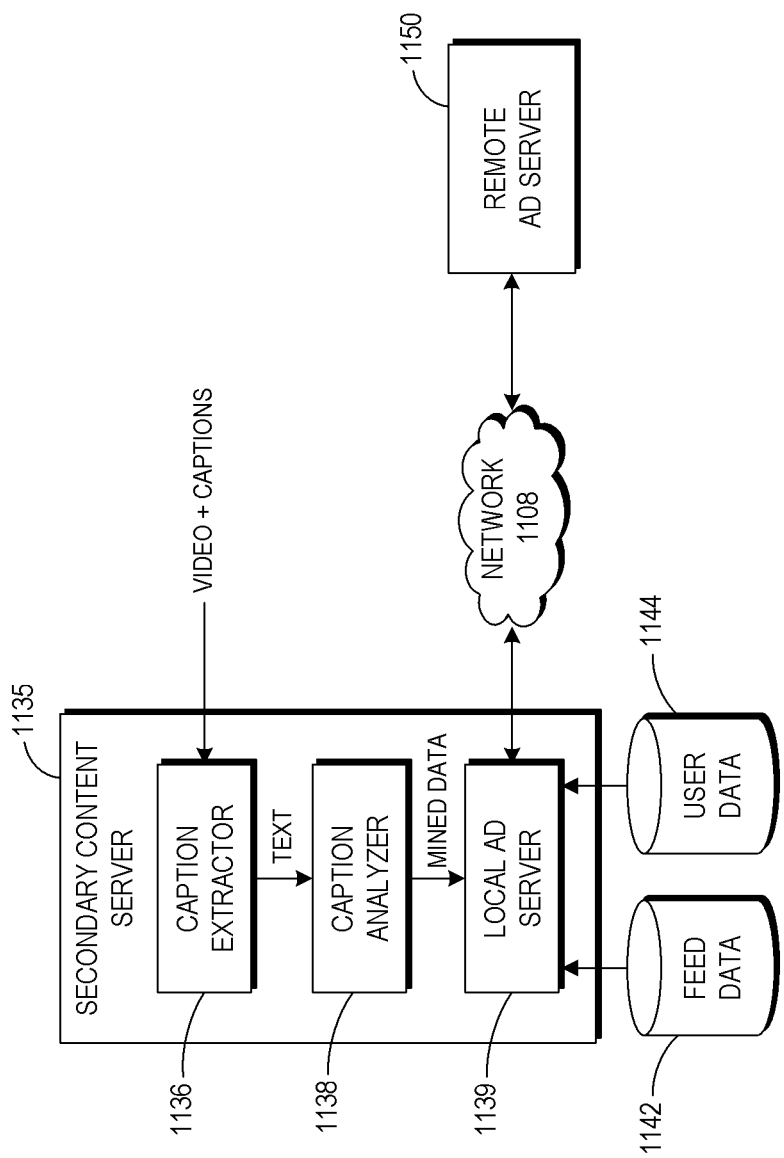
FIGS. 11A and 11B depict example embodiments of a secondary content server associated with a television audio delivery system.

Turning to FIG. 11A, a more detailed embodiment of the secondary content server 1035 is shown, in particular, the secondary content server 1135. The secondary content server 1135 includes a caption extractor 1136, a caption analyzer 1138, and a local ad server 1139. The caption extractor 1136 can receive video including captions as described above with respect to FIG. 10. The caption extractor 1136 can extract the captions from the video or from a separate caption file or subtitle file included with the video. The output of the caption extractor 1136 can include text to the caption analyzer 1138.

The caption analyzer 1138 can mine the text to identify keywords in the text. For instance, the caption analyzer 1138 might initially remove stop words from the text such as articles "a," "and," "the," and other minor words that may have little or no content associated with them. The caption analyzer 1138 can then count the keywords and sort the keywords based on their frequency of occurrence to identify keywords that may correspond to topics of interest in the text. In this manner, the caption analyzer 1138 may be able to identify topics or categories based on these keywords that may be relevant for providing ads to a user. For instance, if the user is listening and watching a basketball game, basketball-related terms may arise frequently in the text extracted by the caption extractor 1136. The caption analyzer 1138 can identify these terms and optionally identify them as being associated with basketball or the topic of basketball.

The caption analyzer 1138 can pass mined data to the local ad server 1139. This mined data may include any subset of keywords or topics identified by the caption analyzer 1138. For instance, the caption analyzer 1138 may select a most highly-ranked subset of the keywords based on their frequency of occurrence, all of the keywords, one or two of the keywords or a small number of keywords. The local ad server 1139 can request ads from a remote ad server 1150 over a network 1108. The remote ad server 1150 can have all the functionality of the remote ad server 950 described above. Likewise, the network 1108 can have any of the functionalities of the networks described herein. The remote ad server 1150 can return an ad to the local ad server 1139, which may provide the ad to the mobile application 610, 910, for example, to the content processor 616 of the mobile application 610 (see FIG. 6). This content processor 616 can then output the ad to the user interface 614 of the mobile application 610 for presentation to a user as shown, for example, in FIG. 8.

Over time, the keywords and/or topics obtained by the caption analyzer 1138 may change as the program watched and/or listened to by the user changes, and the ads may be updated accordingly to obtain different relevant ads. For instance, at one point in time, the local ad server 1139 may send basketball-related keywords to the remote ad server 1150, which may return ads relevant to basketball or which may be relevant to a person that is interested in basketball. Subsequently, a different program may come on the television being watched by the user, and the video captions obtained by the caption extractor 1136 may refer to this different program, and the captions may be mined for text and keywords that the local ad server 1139 can then send to the remote ad server 1150.

As described above, the functionality of the local ad server 1139 may also be replicated by, enhanced, or replaced by a similar functionality on the management server 960. For instance, the management server 960 or the local ad server 1139 can track data about the user over time including over multiple visits to the same location and/or to multiple locations that include television audio delivery systems as described herein. The management server 960 (or local ad server 1139) may use keywords mined from multiple shows watched by the user in order to request ads for that particular user that are relevant, even for shows that have transpired previously and which the user is not currently watching. Thus, for instance, if a user in the past was known to frequently tune in to feeds that include text related to sports, and the user is currently watching a news program as indicated by the caption text extracted from the current video being watched, the management server 960 can request ads from the remote ad server 950 that are related to sports instead of or in addition to ads related to the current news program.

Figure 11B:
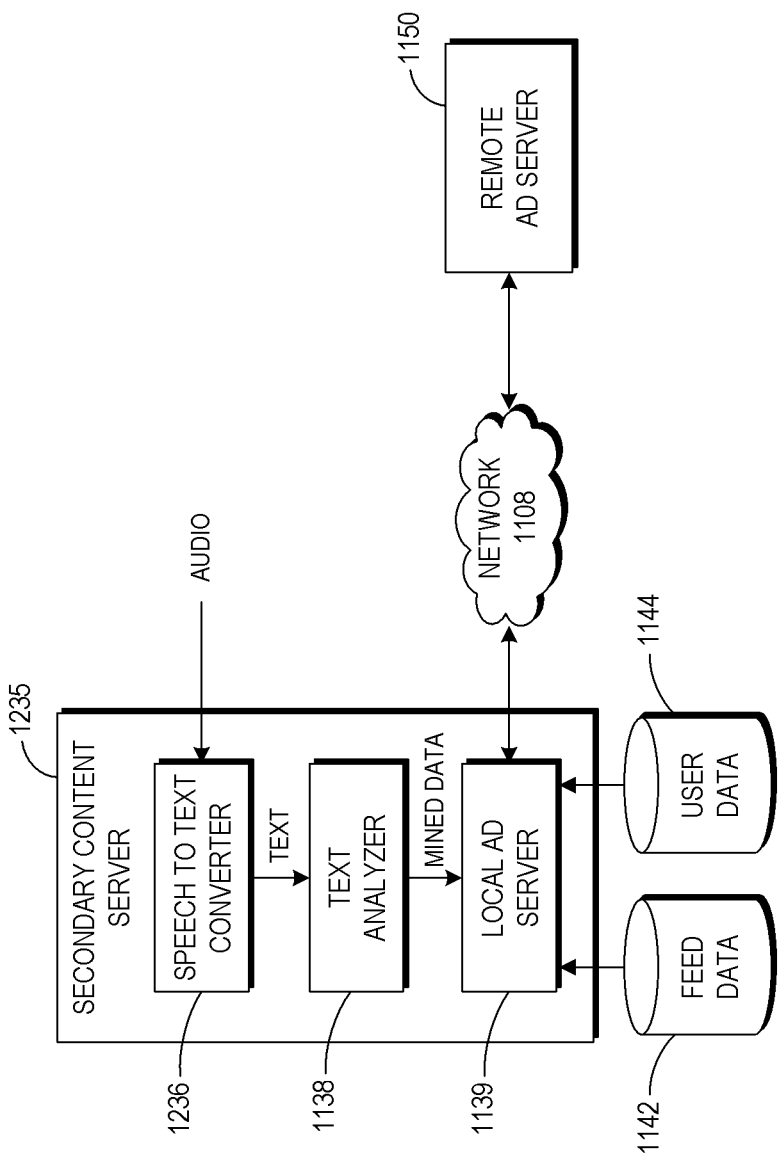

Turning to FIG. 11B, another embodiment of a secondary content server 1235 is shown. The secondary content server includes a speech-to-text converter 1236 that receives audio from an audio feed and using a speech to text software, such as may be available from Nuance™ or the like. The converter 1236 outputs text from the speech to the text analyzer 1138, which can perform the same functionality described above with respect to 11A, for example, by providing mine data to the local ad server 1139 which can request ads from the remote ad server 1150.

Figure 12:
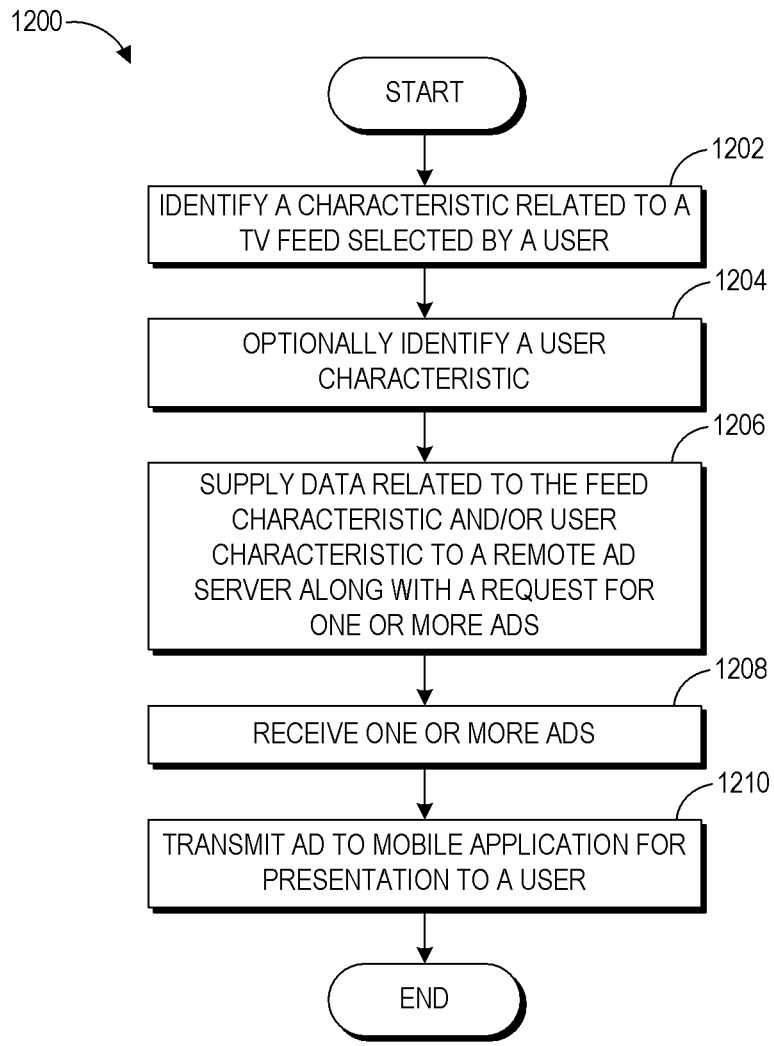
FIG. 12 depicts an embodiment of a feed-based ad serving process.

FIG. 12 depicts an embodiment of a channel-based ad serving process 1200 that can be implemented by any of the secondary content servers described above. The channel based ad serving process 1200 can advantageously serve ads to users of mobile devices that implement the mobile application described above based on information about the feed the user is listening to and/or information about the user himself thereby providing relevant targeted personal ads to users. Further, the channel based ad serving process 1200 can be used to recommend or suggest games or other interactive content to users other than just ads.

At block 1202, the secondary content server identifies a characteristic related to a TV feed selected by a user. The characteristic may be a mined keyword, a topic, or a category related to the feed. In addition, in one embodiment the characteristic may be the type of show or channel being watched or listened to by the user. The secondary content server may be able to obtain the channel info, for instance, based on TV guide scheduling accessible over the Internet or a network to determine what content is being displayed on a particular channel at a given time, for instance, whether a baseball game is being displayed or whether a movie is being displayed, what the genre of the movie is, what the genre of a television show is, the name of the television show, etc. An establishment may also indicate or be able to input to the content server what type of channels are being displayed on given televisions and, therefore, the content server may know what type of channel is being displayed and can use this characteristic to provide ads to users. For example, users that watch ESPN or a sports channel may be targeted with different ads than users that watch a news channel or a cooking channel.

At block 1204 the secondary content server optionally identifies a user characteristic. The user characteristic may be information about the user such as user demographics. When initially installing the mobile application 610, the mobile application 610 may request information from the user about demographics such as age, sex, location of the user, occupation, interests and so forth that may be used as a characteristic to identify targeted ads together with or separate from the characteristic of the television feed being watched or listened to by the user. The characteristic identified by the user may also relate to feeds that the user has listened to in the past and any information about those feeds such as the type of channel, keywords, topics, types of shows and so forth as ads may be generated on a user's past behavior and not just the current listening behavior. The second content server may be able to obtain this information from a local data store such as the local data store 942 based on previous interactions with the content server in a single network by a user or from a multi-user data store such as the multi-site user data store 970, which the secondary content server may access by accessing the management server 960 to obtain data about the user from multiple sites.

At block 1206, the secondary content server supplies data related to the feed characteristic and/or the user characteristic to a remote ad server along with a request for one or more ads. For instance, this data may be any subset of the data that the secondary content server identifies in block 1202 and 1204 and may include simply a keyword or a keyword and a characteristic about the user or a type of topic that the user may be interested in. This information may be obtained based on the secondary content server's analysis of past behavior of the user.

At block 1208 one or more ads are received at the secondary content server and the secondary content server transmits the one or more ads to the mobile application for presentation to the user at block 1210.

Figure 13:
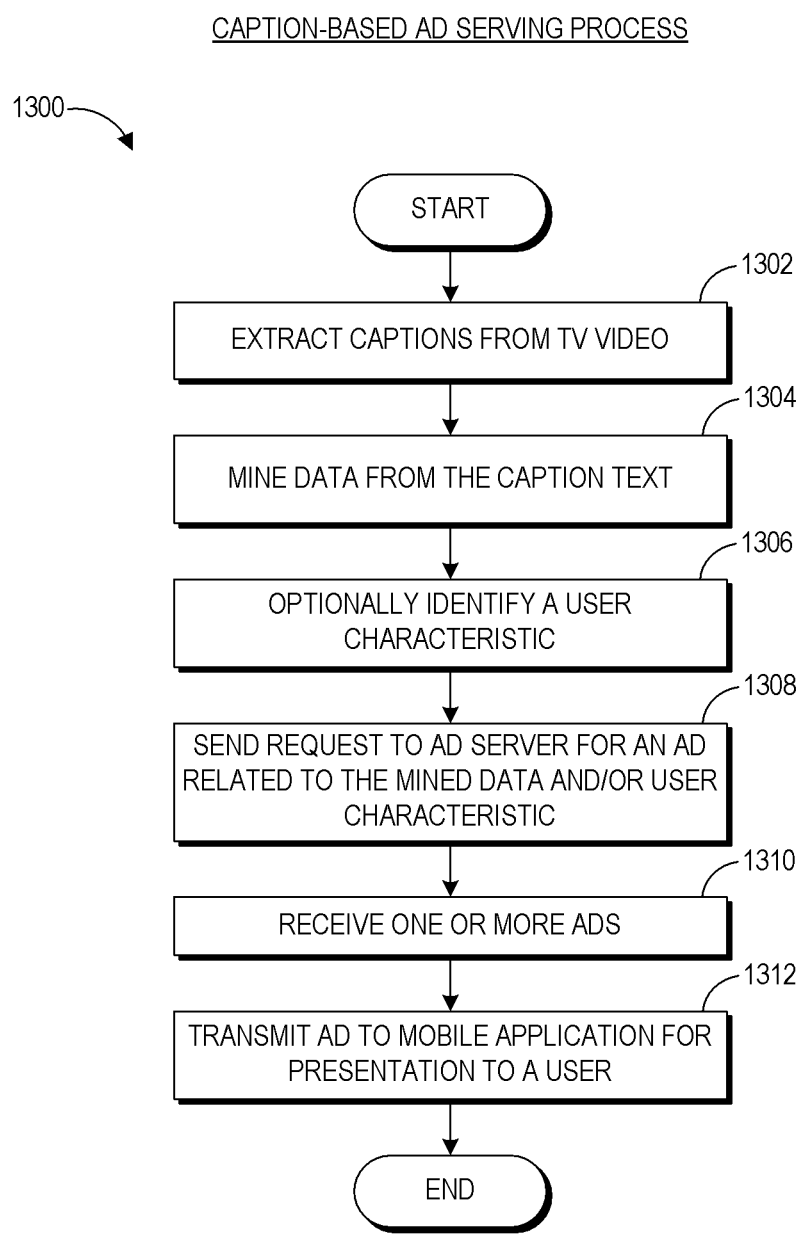
FIG. 13 depicts an embodiment of a caption-based ad serving process.

FIG. 13 illustrates an embodiment of a caption-based ad serving process 1300. The process 1300 may be implemented by any of the secondary content servers described above. At block 1302, the secondary content server extracts captions from TV feed or video, mines data from the caption text at block 1304, optionally identifies a user characteristic such as any of those characteristics described above at block 1306, and sends a request to the ad server for an ad related to the mine data and/or user characteristic at block 1308. The secondary content server receives one or more ads at block 13 and transmits the ads to a mobile application for presentation to a user at block 1312.

Figure 14:
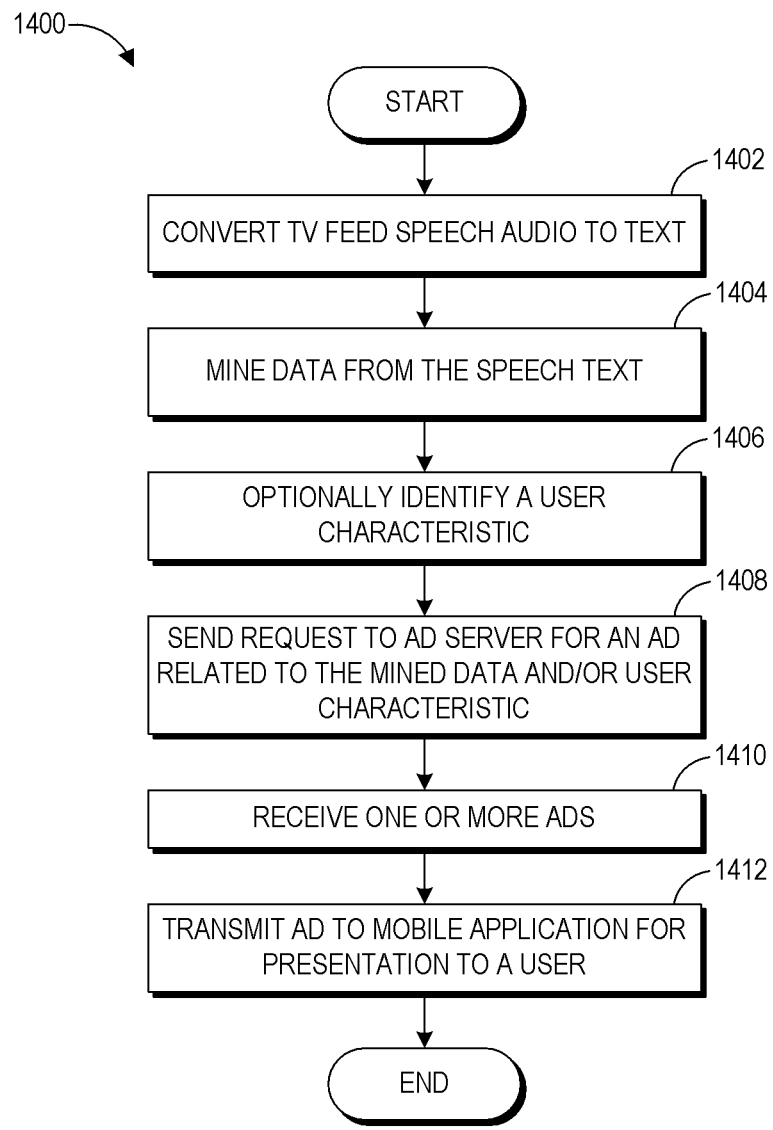
FIG. 14 depicts an embodiment of a speech-based ad serving process.

Similarly, a speech-based ad serving process 1400 is shown in FIG. 14 where the secondary content server can convert a TV feed speech audio to text at block 1402, mine data from a speech text at block 1404, optionally identify a user characteristic at block 1406, and send a request to the ad server for an ad related to the mine data and/or user characteristic at block 1408. The secondary content server receives one or more ads at block 1410 and transmits the ads to a mobile application for presentation to a user at block 1412.

VII. Terminology

Many other variations than those described herein will be apparent from this disclosure. For example, depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A system for streaming an audio feed associated with a corresponding video, the system comprising:
   a content server comprising computer hardware, the computer hardware comprising:
      a sound card driver configured to receive audio sources from a plurality of video devices, each audio source comprising audio associated with a corresponding video;
      a feed data repository configured to store data mapping of each audio source to an audio feed accessible by a conference call identifier, thereby providing a plurality of audio feeds;
      a web server configured to receive a request from a user device to access a list of the audio feeds and to provide the list of the audio feeds to the user device to enable a user to select one of the audio feeds for streaming;
      a Voice over IP (VoIP) server configured to receive a VoIP request from the user device, the VoIP request comprising a selected conference call identifier identifying a selected audio feed of the list of audio feeds; and
      a conference call bridge configured to connect the user device to a conference call associated with the selected conference call identifier to make the selected audio feed available for streaming to the user device.

2. The system of claim 1, wherein the content server further comprises a wireless access point configured to provide wireless access to the user device.

3. The system of claim 1, further comprising one or more signal processing modules configured to provide digitized forms of the audio sources to the content server.

4. The system of claim 3, wherein the one or more signal processing modules comprise a high-definition multimedia interface (HDMI) audio extractor configured to extract audio from a digital HDMI signal.

5. The system of claim 3, wherein the one or more signal processing modules are further configured to receive one or more of the audio sources wirelessly.

6. The system of claim 5, wherein the one or more signal processing modules are further configured to receive the audio source over a very high frequency (VHF) wireless connection.

7. The system of claim 3, further comprising a universal serial bus (USB) hub configured to receive inputs from the one or more signal processing modules and to provide an output to the content server.

8. The system of claim 1, wherein the content server is implemented in an audio-visual receiver.

9. The system of claim 1, wherein the content server is implemented in a television.

10. The system of claim 1, further comprising a domain name server (DNS) configured to provide instructions to the user device for downloading a mobile application to the user device, the mobile application configured to access the content server to obtain the selected audio feed.

11. A method of streaming an audio feed associated with a corresponding video, the method comprising:
by a content server comprising physical computer hardware:
receiving audio sources from a plurality of video devices, each audio source comprising audio associated with a corresponding video, each audio source assigned to an audio feed accessible by a conference call identifier, thereby providing a plurality of audio feeds;
receiving a request from a user device to access a list of the audio feeds;
providing the list of the audio feeds to the user device to enable a user to select one of the audio feeds for streaming;
receiving a Voice over IP (VoIP) request from the user device, the VoIP request comprising a selected conference call identifier identifying a selected audio feed of the list of audio feeds;
connecting the user device to a conference call associated with the selected conference call identifier to make the selected audio feed available for streaming to the user device; and
streaming the selected audio feed to the user device in response to said connecting.

12. The method of claim 11, wherein said connecting the user device to the conference call comprises connecting the user device as a muted participant to the conference call.

13. The method of claim 11, wherein said receiving the VoIP request comprises receiving a session initial protocol (SIP) request.

14. The method of claim 11, wherein the VoIP request implements the following protocols: a session initial protocol (SIP), a real-time transport protocol (RTP), and a uniform datagram protocol (UDP).

15. The method of claim 11, wherein the VoIP request implements a H.323 protocol.

16. The method of claim 11, further comprising connecting second user devices to the conference call in response to requests from the second user devices to access the selected audio feed.

* * * * *